United States Patent
Tanimoto

(10) Patent No.: US 9,596,178 B2
(45) Date of Patent: Mar. 14, 2017

(54) RELAY SERVER AND RELAY COMMUNICATION SYSTEM

(75) Inventor: Yoshifumi Tanimoto, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 209 days.

(21) Appl. No.: 14/003,558

(22) PCT Filed: Jan. 25, 2012

(86) PCT No.: PCT/JP2012/000460
§ 371 (c)(1),
(2), (4) Date: Sep. 6, 2013

(87) PCT Pub. No.: WO2012/120767
PCT Pub. Date: Sep. 13, 2012

(65) Prior Publication Data
US 2013/0346487 A1   Dec. 26, 2013

(30) Foreign Application Priority Data

Mar. 9, 2011   (JP) .................................. 2011-051834

(51) Int. Cl.
*G06F 15/16* (2006.01)
*H04L 12/741* (2013.01)
(Continued)

(52) U.S. Cl.
CPC ........ *H04L 45/745* (2013.01); *H04L 12/4641* (2013.01); *H04L 61/2535* (2013.01)

(58) Field of Classification Search
CPC ............. H04L 12/4641; H04L 61/2514; H04L 63/0272; H04L 29/12367; H04L 61/25;
(Continued)

(56) References Cited

U.S. PATENT DOCUMENTS

| 7,366,188 B2 | 4/2008 | Kim |
| 2002/0095506 A1 | 7/2002 | Tanimoto |

(Continued)

FOREIGN PATENT DOCUMENTS

| CN | 101202709 A | 6/2008 |
| JP | 2002-217938 A | 8/2002 |
| JP | 2008-301024 A | 12/2008 |

OTHER PUBLICATIONS

Official Communication issued in corresponding European Patent Application No. 12754541.6, mailed on Nov. 11, 2014.
(Continued)

*Primary Examiner* — Arvin Eskandarnia
*Assistant Examiner* — Kamran Mohammadi
(74) *Attorney, Agent, or Firm* — Keating & Bennett, LLP

(57) ABSTRACT

A relay server mainly includes a VPN group information storage unit, an address filter information storage unit, and a communication control unit. The VPN group information storage unit is arranged and programmed to store information concerning routing apparatuses that define a VPN group and a routing session. The address filter information storage unit is arranged and programmed to store address filter information in association with identification information of the routing apparatus. The communication control unit is arranged and programmed to perform controls of: upon detection of that an address included in the address filter information overlaps, causing a translated address to be associated with the overlapping address, and transmitting the translated address to another routing apparatus; and performing routing based on the address filter information and the translated address.

13 Claims, 19 Drawing Sheets

(51) Int. Cl.
*H04L 12/46* (2006.01)
*H04L 29/12* (2006.01)

(58) Field of Classification Search
CPC ............. H04L 61/2589; H04L 29/1233; H04L 45/745; H04L 61/2503
See application file for complete search history.

(56) References Cited

U.S. PATENT DOCUMENTS

| | | | |
|---|---|---|---|
| 2002/0191576 A1* | 12/2002 | Inoue | H04L 12/4641 370/338 |
| 2008/0137672 A1* | 6/2008 | Tanimoto | H04L 12/66 370/401 |
| 2008/0298367 A1* | 12/2008 | Furukawa | H04L 12/4641 370/392 |
| 2009/0144288 A1* | 6/2009 | Refuah | G06F 17/3087 |
| 2009/0172075 A1 | 7/2009 | Tanimoto | |
| 2010/0020738 A1* | 1/2010 | Inouchi | H04L 12/4666 370/315 |
| 2010/0158010 A1* | 6/2010 | Kang | H04L 45/00 370/392 |
| 2011/0238835 A1 | 9/2011 | Tanimoto | |
| 2012/0151059 A1 | 6/2012 | Tanimoto et al. | |

OTHER PUBLICATIONS

Official Communication issued in International Patent Application No. PCT/JP2012/000460, mailed on Feb. 28, 2012.

\* cited by examiner

Fig.3

```
<?xml version="1.0" encoding="UTF-8" ?>
-<root>
    -<group id="group-a@relay-server-1.abc.net"              ⎤ 511
       lastmod="20090402133100" name="GROUP A">              ⎦
       <site id="relay-server-1@abc.net" rel="allow"/>       ⎤
       <site id="relay-server-2@abc.net" rel="allow"/>       ⎥ 512
       <site id="relay-server-3@abc.net" rel="allow"/>       ⎥
       <site id="relay-server-4@abc.net" rel="allow"/>       ⎦
    </group>
</root>
```

Fig.4

```
<?xml version="1.0" encoding="UTF-8" ?>
-<root>
    -<site id="relay-server-1@abc.net"                                        ⎤ 521
        name="RELAY SERVER 1" stat="active">                                  ⎦
        -<node group="group-a@relay-server-1.abc.net"                         ⎤
           id="client-11@relay-server-1.abc.net"                              ⎥ 522
           name="CLIENT 11" site="relay-server-1@abc.net"/>                   ⎦
    </site>
    -<site id="relay-server-2@abc.net"                                        ⎤ 521
        name="RELAY SERVER 2" stat="active">                                  ⎦
        -<node group="group-a@relay-server-1.abc.net"                         ⎤
           id="client-21@relay-server-2.abc.net"                              ⎥ 522
           name="CLIENT 21" site="relay-server-2@abc.net"/>                   ⎦
    </site>
    -<site id="relay-server-3@abc.net"                                        ⎤ 521
        name="RELAY SERVER 3" stat="active">                                  ⎦
        -<node group="group-a@relay-server-1.abc.net"                         ⎤
           id="client-31@relay-server-3.abc.net"                              ⎥ 522
           name="CLIENT 31" site="relay-server-3@abc.net"/>                   ⎦
    </site>
    -<site id="relay-server-4@abc.net"                                        ⎤ 521
        name="RELAY SERVER 4" stat="active">                                  ⎦
        -<node group="group-a@relay-server-1.abc.net"                         ⎤
           id="client-41@relay-server-4.abc.net"                              ⎥ 522
           name="CLIENT 41" site="relay-server-4@abc.net"/>                   ⎦
    </site>
</root>
```

Fig.5

(a)
```
<?xml version="1.0" encoding="UTF-8" ?>
-<root>
  -<node addr="192.168.11.111"
      group="group-a@relay-server-1.abc.net"
      id="client-11@relay-server-1.abc.net"
      name="CLIENT 11" pass="abc" port="5070">
    </node>
  </root>
```

(b)
```
<?xml version="1.0" encoding="UTF-8" ?>
-<root>
  -<node addr="192.168.22.121"
      group="group-a@relay-server-1.abc.net"
      id="client-21@relay-server-2.abc.net"
      name="CLIENT 21" pass="abc" port="5070">
    </node>
  </root>
```

(c)
```
<?xml version="1.0" encoding="UTF-8" ?>
-<root>
  -<node addr="192.168.33.131"
      group="group-a@relay-server-1.abc.net"
      id="client-31@relay-server-3.abc.net"
      name="CLIENT 31" pass="abc" port="5070">
    </node>
  </root>
```

(d)
```
<?xml version="1.0" encoding="UTF-8" ?>
-<root>
  -<node addr="192.168.44.141"
      group="group-a@relay-server-1.abc.net"
      id="client-41@relay-server-4.abc.net"
      name="CLIENT 41" pass="abc" port="5070">
    </node>
  </root>
```

Fig.6

```
<?xml version="1.0" encoding="UTF-8"?>
-<root>
    -<vnet group="group-a@relay-server-1.abc.net"
        id="vpn-group-1@abc.net"
        lastmod="20090410162500" name="VPN-GROUP 1">          541
        <rp id="client-11@relay-server-1.abc.net"/>
        <rp id="client-21@relay-server-2.abc.net"/>           542
        <rp id="relay-server-3@abc.net"/>
        <ssn sp="client-11@relay-server-1.abc.net"
            ep="client-21@relay-server-2.abc.net"/>
        <ssn sp="client-11@relay-server-1.abc.net"            543
            ep="relay-server-3@abc.net"/>
        <ssn sp="client-21@relay-server-2.abc.net"
            ep="relay-server-3@abc.net"/>
    </vnet>
</root>
```

| NAME OF ROUTING APPARATUS | NAME OF ROUTING OBJECT DEVICE |
|---|---|
| CLIENT TERMINAL 11 | COMMUNICATION APPARATUS 12 |
| CLIENT TERMINAL 21 | FILE SERVER 22 |
| | FILE SERVER 23 |
| | COMMUNICATION APPARATUS 24 |
| RELAY SERVER 3 | LAN 30 |

(b)

| IDENTIFICATION INFORMATION OF ROUTING APPARATUS | IP ADDRESS OF ROUTING OBJECT DEVICE | NAME OF ROUTING OBJECT DEVICE |
|---|---|---|
| client-11@relay-server-1.abc.net | 192.168.11.111 | COMMUNICATION APPARATUS 12 |
| client-21@relay-server-2.abc.net | 192.168.22.122 | FILE SERVER 22 |
| | 192.168.22.123 | FILE SERVER 23 |
| | 192.168.22.124 | COMMUNICATION APPARATUS 24 |
| relay-server-3@abc.net | 192.168.33.0/24 | LAN 30 |

| IDENTIFICATION INFORMATION OF ROUTING APPARATUS | ACTUAL IP ADDRESS OF ROUTING OBJECT DEVICE | COMMUNICATION IP ADDRESS OF ROUTING OBJECT DEVICE (TRANSLATED ADDRESS) | NAME OF ROUTING OBJECT DEVICE |
|---|---|---|---|
| client-11@relay-server-1.abc.net | 192.168.11.111 | — | COMMUNICATION APPARATUS 12 |
| client-21@relay-server-2.abc.net | 192.168.22.122 | — | FILE SERVER 22 |
|  | 192.168.22.123 | — | FILE SERVER 23 |
|  | 192.168.22.124 | — | COMMUNICATION APPARATUS 24 |
| relay-server-3@abc.net | 192.168.22.0/24 | — | LAN 30 |

(b)

| IDENTIFICATION INFORMATION OF ROUTING APPARATUS | ACTUAL IP ADDRESS OF ROUTING OBJECT DEVICE | COMMUNICATION IP ADDRESS OF ROUTING OBJECT DEVICE (TRANSLATED ADDRESS) | NAME OF ROUTING OBJECT DEVICE |
|---|---|---|---|
| client-11@relay-server-1.abc.net | 192.168.11.111 | — | COMMUNICATION APPARATUS 12 |
| client-21@relay-server-2.abc.net | 192.168.22.122 | 192.168.0.122 | FILE SERVER 22 |
|  | 192.168.22.123 | 192.168.0.123 | FILE SERVER 23 |
|  | 192.168.22.124 | 192.168.0.124 | COMMUNICATION APPARATUS 24 |
| relay-server-3@abc.net | 192.168.22.0/24 | 192.168.1.0/24 | LAN 30 |

Fig.15

| NAME | COMMUNICATION IP ADDRESS | ACTUAL IP ADDRESS |
|---|---|---|
| COMMUNICATION APPARATUS 12 | 192.168.11.111 | — |
| FILE SERVER 22 | 192.168.0.122 | 192.168.22.122 |
| FILE SERVER 23 | 192.168.0.123 | 192.168.22.123 |
| COMMUNICATION APPARATUS 24 | 192.168.0.124 | 192.168.22.124 |
| LAN 30 | 192.168.1.0/24 | 192.168.22.0/24 |

RELAY SERVER AND RELAY COMMUNICATION SYSTEM

BACKGROUND OF THE INVENTION

1. Field of the Invention

The present invention relates to a relay server and more specifically to a relay server that enables communication to be performed between terminals connected to different LANs (Local Area Networks).

2. Description of the Related Art

Conventionally, a communication technology called a virtual private network (Virtual Private Network, VPN) has been known (for example, see Japanese Patent Application Laid-Open No. 2002-217938). The VPN is used for, for example, performing communication via the Internet between terminals that are connected to LANs of a plurality of branch offices (stations) each located in different regions. Use of the VPN enables another LAN located in a distant place to be used as if it is a directly-connected network.

In this type of system, communication between terminals is performed with use of IP addresses (private IP addresses) of terminals that are connected to LANs. The IP addresses are assigned without any overlap in the same LAN, but may overlap among terminals that are connected to different LANs. In such a case, two or more identical IP addresses exist in the VPN, which makes it impossible to perform proper communication.

To avoid such a situation, it is necessary that, when there are overlapping IP addresses, the VPN is once terminated (or alternatively apparatuses having the overlapping IP addresses set therefor are logged out of the VPN), and then re-setting of IP addresses is performed. However, the re-setting of IP addresses affects other apparatuses that are connected to the same LAN. Therefore, changing the IP address may not be practical in some LANs. In this point, improvement has been demanded in the VPN.

SUMMARY OF THE INVENTION

Preferred embodiments of the present invention provide a relay server that is able to build a VPN in which, even in a case where LANs having overlapping addresses are connected, communication can be performed without changing addresses that have been set.

In a first preferred embodiment of the present invention, a relay server includes a relay group information storage unit, a relay server information storage unit, a VPN group information storage unit, an address filter information storage unit, and a communication control unit. The relay group information storage unit is arranged to store relay group information concerning a relay group including another relay server that is mutually connectable with the relay server. The relay server information storage unit is arranged to store relay server information including relay server start-up information, client terminal start-up information, and client terminal registration information. The relay server start-up information concerns the relay server belonging to the relay group. The client terminal start-up information and the client terminal registration information concern a client terminal that is connected to the relay server belonging to the relay group. The VPN group information storage unit relates to a VPN group including routing apparatuses that are communication apparatuses being set as routing points among communication apparatuses included in a relay communication system based on the relay group information and the relay server information. The VPN group is configured to perform communication in a virtual private network via a routing session established among the routing apparatuses. The VPN group information storage unit is arranged to store identification information of the routing apparatuses that define the VPN group and routing session information indicating the routing apparatuses that are connected to one another. The address filter information storage unit is arranged to store address filter information indicating an address of a routing object device that the routing apparatus is able to designate as a forwarding destination to which a packet is to be forwarded, in association with identification information of the routing apparatus. The communication control unit is arranged and programmed to perform controls which: make a plurality of VPN groups and store the plurality of VPN groups in the VPN group information storage unit; when a VPN group to be started up is selected from the plurality of VPN groups stored in the VPN group information storage unit, determine whether or not the address included in the address filter information overlaps among the routing apparatuses belonging to the selected VPN group, and upon detection that the address is overlapping, make a translated address table in which a translated address that is an address not used in the selected VPN group is associated with the overlapping address, and transmit the translated address table to the other routing apparatuses that belong to the selected VPN group; and perform routing based on the translated address table.

This enables the relay server to build a VPN with the routing apparatuses selected from the other communication apparatuses (other relay servers and the client terminals) included in the relay communication system. Therefore, for example, a file is shared only with a necessary apparatus. Even in a case where a VPN is built between networks to which identical addresses are assigned, routing of a packet is performed without changing an actual address.

In the relay server, it is preferable that the communication control unit is arranged and programmed to perform at least one of a source address translation process and a destination address translation process. The source address translation process is a process in which, when receiving a packet in which an actual address is designated as a source address, a translation of the source address of the packet from the actual address into the translated address is performed. The destination address translation process is a process in which, when receiving a packet in which the translated address is designated as a destination address of the packet, translating the destination address from the translated address into an actual address is performed.

Accordingly, performing the source address translation process enables the destination of the packet to be informed of the source of the packet, and performing the destination address translation process enables the packet to be transmitted to a proper destination.

In the relay server, it is preferable that, in a case of functioning as a source-side routing point, the communication control unit performs at least one of the source address translation process and the destination address translation process.

In the relay server, it is preferable that, in a case of functioning as a source-side routing point, the communication control unit is arranged and programmed to perform the source address translation process, and to transmit a packet to the other routing apparatuses via a routing session.

Preferably, the relay server is configured as follows. In a case of functioning as a source-side routing point, the communication control unit is arranged and programmed to perform both the source address translation process and the destination address translation process. The communication control unit is arranged and programmed to transmit a packet to the other routing apparatuses via a routing session.

In the relay server, it is preferable that, in a case of functioning as a destination-side routing point, the communication control unit is arranged and programmed to perform, among the source address translation process and the destination address translation process, an address translation process that is not performed by a source-side routing point.

In the relay server, it is preferable that, in a case of functioning as a destination-side routing point, when the destination address translation process is performed, a packet is forwarded based on an actual address that is an address obtained after the translation.

In this manner, the destination address translation process and the source address translation process can be performed at any timing. More specifically, in preferred embodiments of the present invention, the routing session is selected based on the address filter information, such that a packet is transmitted to a proper routing apparatus. Therefore, it is possible to change the destination address in the source-side routing point. Accordingly, translating not only the source address but also the destination address in the source-side routing point allows omission of the address translation process in the destination-side routing point. Additionally, in a case of functioning as a destination-side routing point, the relay server performs the address translation process that is not performed by the source-side routing point. As a result, the translation of both the destination address and the source address is completed.

In the relay server, it is preferable that an actual address and the translated address are displayable on an external display device, in association with a name of the routing object device of which the addresses are set.

This informs the user of which apparatus is associated with the translated address. Accordingly, for example, a setting of designating the translated address as the destination address is simplified.

Preferably, the relay server is configured as follows. The VPN group information storage unit is arranged to store, as the routing session information, identification information of the routing apparatus in a side that takes initiative to perform a communication control of establishing a routing session, and identification information of the routing apparatus in a side that receives the communication control. In a case where the relay server itself is set as the side that takes initiative to perform the communication control in all routing sessions established with the relay server itself, the communication control unit performs a control to cause the translated address to be associated with the overlapping address and transmitting the translated address to the other routing apparatuses.

Accordingly, in the VPN group, normally, one routing apparatus performs the control to make the translated address. This prevents the process of associating the translated address, and the like, from being performed a plurality of times.

In a second preferred embodiment of the present invention, a relay communication system includes a plurality of relay servers, and client terminals. The client terminals are connectable with each other via the relay servers. The relay server includes a relay group information storage unit, a relay server information storage unit, a VPN group information storage unit, an address filter information storage unit, and a communication control unit. The relay group information storage unit is arranged to store relay group information concerning a relay group including another relay server that is mutually connectable with the relay server. The relay server information storage unit is arranged to store relay server information including relay server start-up information, client terminal start-up information, and client terminal registration information. The relay server start-up information concerns the relay server belonging to the relay group. The client terminal start-up information and the client terminal registration information concern the client terminal. The VPN group information storage unit relates to a VPN group defined by routing apparatuses that are set as routing points among the relay servers and the client terminals. The VPN group is configured to perform communication in a virtual private network via a routing session established among the routing apparatuses. The VPN group information storage unit is arranged and programmed to store identification information of the routing apparatuses that define the VPN group and routing session information indicating the routing apparatuses that are connected to one another. The address filter information storage unit is arranged to store address filter information indicating a routing object device that the routing apparatus is able to designate as a forwarding destination to which a packet is to be forwarded, in association with identification information of the routing apparatus. The communication control unit is arranged and programmed to perform controls to: make a plurality of VPN groups and store the plurality of VPN groups in the VPN group information storage unit; when a VPN group to be started up is selected from the plurality of VPN groups stored in the VPN group information storage unit, determine whether or not the address included in the address filter information overlaps among the routing apparatuses belonging to the selected VPN group, and upon detection of that the address is overlapping, make a translated address table in which a translated address that is an address not used in the selected VPN group is associated with the overlapping address, and transmit the translated address table to the other routing apparatuses that belong to the selected VPN group; and perform routing based on the translated address table.

This enables a VPN to be built by using the routing apparatuses selected from the relay servers and the client terminals. Therefore, for example, a file is shared only with a necessary apparatus. Even in a case where a VPN is built between networks to which identical addresses are assigned, routing of a packet is preferably performed without changing an actual address.

Another preferred embodiment of the present invention provides a configuration in which the storage units and the control unit mentioned above are included in the routing apparatus instead of the relay server, and also provides the relay communication system including such a routing apparatus.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram showing a content of relay group information according to a preferred embodiment of the present invention.

FIG. 4 is a diagram showing a content of relay server information according to a preferred embodiment of the present invention.

FIG. 5 is a diagram showing a content of client terminal information according to a preferred embodiment of the present invention.

FIG. 6 is a diagram showing a content of VPN group information according to a preferred embodiment of the present invention.

FIG. 7 is a diagram showing an exemplary content stored in an address filter information storage unit according to a preferred embodiment of the present invention.

FIG. 14 is a diagram showing an exemplary content stored in the address filter information storage unit after a translated address table is notified according to a preferred embodiment of the present invention.

FIG. 15 is a diagram showing a display content at a time when a communication IP address is displayed on an external display device according to a preferred embodiment of the present invention.

DETAILED DESCRIPTION OF THE PREFERRED EMBODIMENTS

Figure 1:
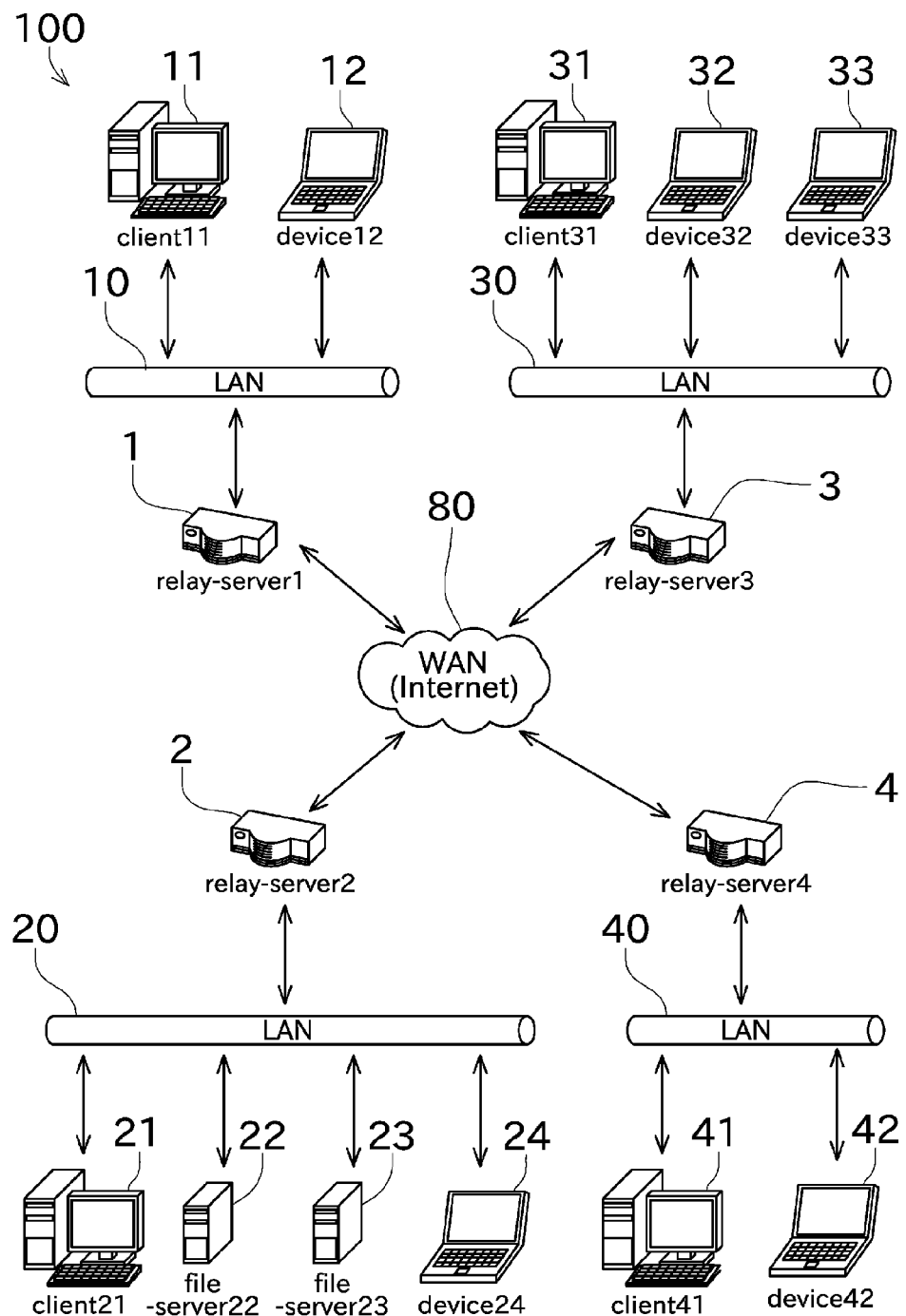
FIG. 1 is a diagram for explaining an overall configuration of a relay communication system according to a first preferred embodiment of the present invention.

Next, preferred embodiments of the present invention will be described with reference to the drawings. Firstly, with reference to FIG. 1, an outline of a relay communication system 100 according to a first preferred embodiment of the present invention will be described. FIG. 1 is an explanatory diagram showing an overall configuration of a relay communication system 100 according to a first preferred embodiment of the present invention.

As shown in FIG. 1, the relay communication system 100 preferably includes a plurality of LANs 10, 20, 30, and 40 that are connected to a Wide Area Network (WAN, wide area communication network) 80. Each of the LANs 10, 20, 30, and 40 is a relatively small network built in a limited place. They are built in physically remote spaces. In this preferred embodiment, the Internet is preferably used as the WAN 80, but any other network could be used, for example.

In the following, a specific description will be given to each LAN. As shown in FIG. 1, a relay server 1, a client terminal 11, and a communication apparatus 12 are preferably connected to the LAN 10. A relay server 2, a client terminal 21, a file server 22, a file server 23, a communication apparatus 24 are preferably connected to the LAN 20. A relay server 3, a client terminal 31, a communication apparatus 32, and a communication apparatus 33 are preferably connected to the LAN 30. A relay server 4, a client terminal 41, and a communication apparatus 42 are preferably connected to the LAN 40.

Each of the relay servers 1, 2, 3, and 4 is connected not only to each of the LANs 10, 20, 30, and 40 but also to the WAN 80, and therefore able to communicate not only with the client terminal connected to the same LAN but also with the relay servers connected to the other LANs. Accordingly, not only a global IP address but also a private IP address is given to each of the relay servers 1, 2, 3, and 4.

The client terminals 11, 21, 31, and 41 are preferably, for example, configured as personal computers, which are able to communicate with one another via the relay servers 1, 2, 3, and 4. The communication apparatuses 12, 24, 32, 33, and 42 are preferably, for example, configured as personal computers, which are able to transmit packets via the LANS 10, 20, 30, and 40 to the client terminals 11, 21, 31, and 41, for example. The file servers 22 and 23 are preferably, for example, configured as network attached storages, which are able to transmit packets via the LAN 20 to the client terminal 21, for example.

Figure 2:
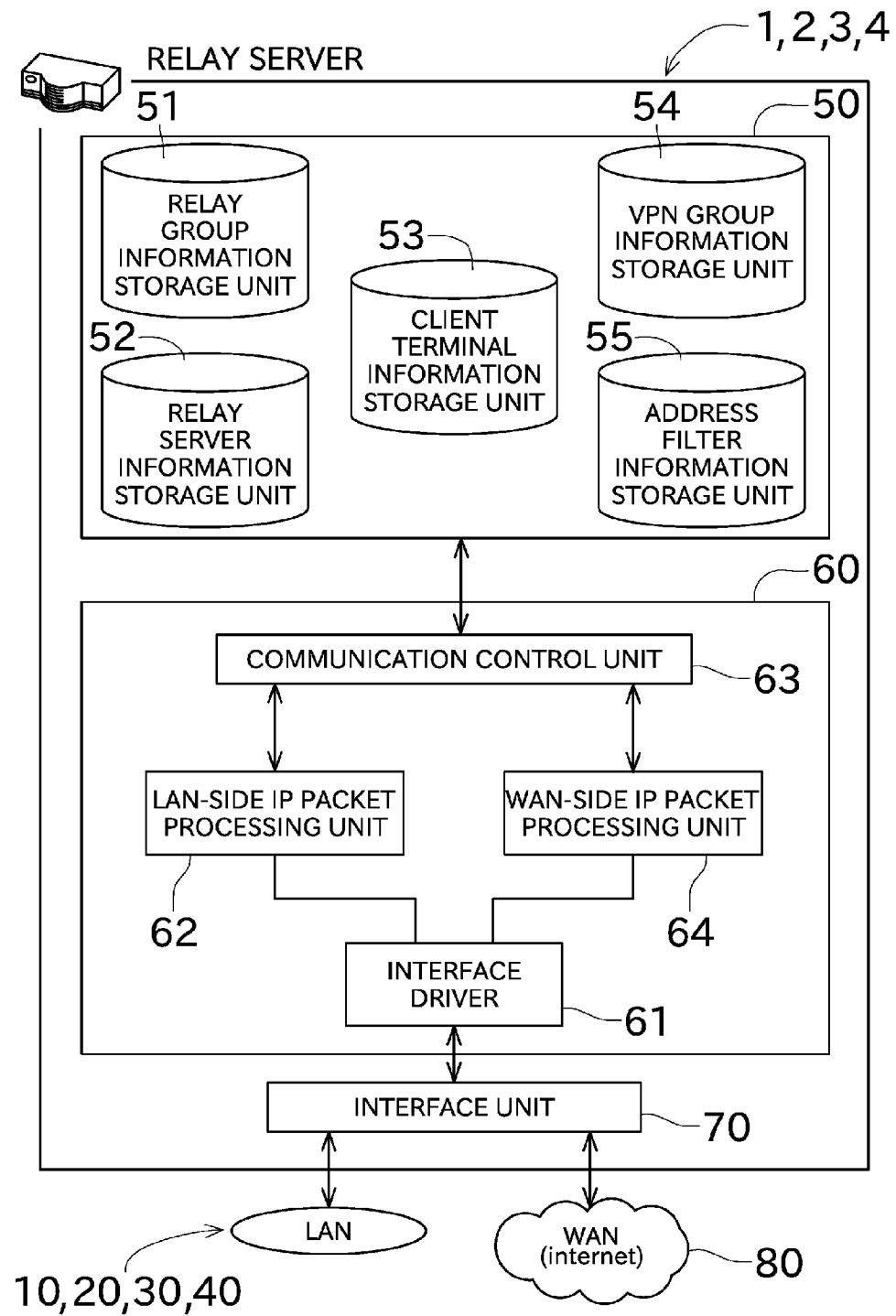
FIG. 2 is a functional block diagram of a relay server according to a preferred embodiment of the present invention.

Next, the relay servers 1, 2, 3, and 4 will be described. These four relay servers preferably have the same or substantially the same configuration except for portions of contents stored therein. Therefore, the relay server 1 will be described as a representative. Firstly, a configuration included in the relay server 1 will be described with reference to FIG. 2. FIG. 2 is a function block diagram of any of the relay servers 1, 2, 3, and 4.

As shown in FIG. 2, the relay server 1 preferably includes a storage unit 50, a control unit 60, and an interface unit 70.

The interface unit 70 is arranged to communicate with a terminal within the LAN 10 by using the private IP address. The interface unit 70 is also capable of communication through the WAN 80 by using the global IP address.

The control unit 60 is preferably, for example, a CPU with control and computation functions, and arranged and programmed to execute various kinds of processing based on a program read out from the storage unit 50. The control unit 60 is preferably arranged and programmed to control various kinds of communication in accordance with a protocol such as TCP/IP, UDP, or SIP. As shown in FIG. 2, the control unit 60 preferably includes an interface driver 61, a LAN-side IP packet processing unit 62, a communication control unit 63, and a WAN-side IP packet processing unit 64.

The interface driver 61 preferably includes driver software that controls the interface unit 70. The LAN-side IP packet processing unit 62 is arranged and programmed to perform an appropriate process on a packet received from the LAN 10, and to output a resultant to the communication control unit 63. The WAN-side IP packet processing unit 64 is arranged and programmed to perform an appropriate process on a packet received from the WAN 80, and to output a resultant to the communication control unit 63.

The communication control unit 63 is arranged and programmed to determine a destination of the received packet based on information indicated by the packet and information stored in the storage unit 50, and transmit the packet to the determined destination. The communication control unit 63 is arranged and programmed to update a content stored in the storage unit 50 based on information received from another terminal.

The storage unit 50 is preferably, for example, configured as a hard disk or a non-volatile RAM, and able to store various types of data. The storage unit 50 preferably includes a relay group information storage unit 51, a relay server information storage unit 52, a client terminal information storage unit 53, a VPN group information storage unit 54, and an address filter information storage unit 55. Hereinafter, a content stored in the storage unit 50 will be described with reference to FIGS. 3 to 7. FIG. 3 is a diagram showing a content of relay group information. FIG. 4 is a diagram showing a content of relay server information. FIG. 5 is a diagram showing a content of client terminal information. FIG. 6 is a diagram showing a content of VPN group information. FIG. 7 is a diagram showing a content of address filter information.

The relay group information storage unit 51 is arranged and programmed to store relay group information indicating a relay group and a relay server that defines this relay group.

As shown in FIG. 3, in the relay group information, a group tag and site tags that are child elements whose parent element is the group tag are described. In the group tag, group information 511 concerning a relay group is described. As the group information 511, identification information ("id") of the relay group, a last modification time ("lastmod"), and a name ("name") of the relay group, are described. In the site tags, group configuration information 512 concerning relay servers that define the relay group is described. In the group configuration information 512, identification information ("id") of these relay servers is described. An additional relay group can be formed. In such a case, a new relay group is given unique identification information different from those of the other relay groups. This enables such setting that, for example, data exchange is performed only within a specific relay group.

The relay group information is shared among the relay servers 1, 2, 3, and 4 that define this relay group. In a case where a certain relay server performs a process of changing the relay group, it is transmitted to the other relay servers and the relay group information is updated. In this manner, the relay group information is dynamically shared.

The relay server information storage unit 52 is arranged to store relay server information indicating an outline of a relay server that performs relay communication and a client terminal that belongs to this relay server.

In the relay server information shown in FIG. 4, site tags each described for each relay server, and node tags that are child elements whose parent elements are the site tags, are described. In the site tag, server information 521 concerning the relay server 1 is described. As the server information 521, identification information ("id") of the relay server, a name ("name") of the relay server, and start-up information ("stat"), are described. The stat being "active" indicates that the relay server logs in to the relay communication system 100, and the stat being blank indicates that the relay server is logging off. In the node tag that is the child element of the site tag, belonging information 522 indicating a client terminal belonging to the relay server is described. As the belonging information 522, a relay group ("group") to which a client terminal belongs, identification information ("id") of the client terminal, a name ("name") of the client terminal, and identification information ("site") of the relay server that is a login destination, are described. When the client terminal does not log in to the relay server (relay communication system 100), the "site" is blank.

Communication by the relay group is preferably performed based on the above-described relay group information and relay server information, in the following manner. For example, in a case where a packet is transmitted from the client terminal 11 to the client terminal 21, the client terminal 11 firstly transmits a packet to the relay server 1 that is the relay server to which the client terminal 11 itself is connected. Here, a relay server capable of packet exchange can be recognized based on the above-described relay group information, and the identification information of a client terminal belonging to the relay server, and whether or not the client terminal is connected, can be determined based on the above-described relay server information. Based on such information, the relay server 1 transmits the packet to the relay server 2 that is the relay server to which the client terminal 21 is connected. Then, the relay server 2 transmits the packet to the client terminal 21. As a result, relay communication can be performed between client terminals 11 and 21.

As for the relay server information as well as the relay group information, the information is shared among the relay servers 1, 2, 3, and 4 that define this relay group. In a case where a certain relay server performs a process of changing the relay server information, it is transmitted to the other relay servers and the relay server information is updated. In this manner, the relay server information is dynamically shared.

The client terminal information storage unit 53 is arranged to store client terminal information that is detailed information concerning a client terminal. Each of the relay servers 1, 2, 3, and 4 preferably stores the client terminal information concerning only the client terminal belonging to itself. For example, since the client terminal 11 belongs to the relay server 1 as shown in FIG. 1, the client terminal information storage unit 53 included in the relay server 1 preferably stores only the client terminal information of the client terminal 11.

The client terminal information stored in the client terminal information storage unit 53 of the relay server 1 is shown in (a) of FIG. 5. Likewise, the client terminal information stored in the relay server 2 is shown in (b) of FIG. 5, the client terminal information stored in the relay server 3 is shown in (c) of FIG. 5, and the client terminal information stored in the relay server 4 is shown in (d) of FIG. 5.

In the client terminal information shown in FIG. 5, a node tag is described. In the node tag, a private IP address ("addr") of a client terminal, a relay group ("group") to which the client terminal belongs, identification information ("id"), a name ("name"), a passcode ("pass") for logging in to a relay server, and port information ("port"), are described.

The VPN group information storage unit 54 is arranged and programmed to store VPN group information that is information concerning a VPN group defined by relay servers that define a relay group and an apparatus (hereinafter referred to as a routing apparatus) selected from the client terminals. The VPN group is a group provided within the relay group. Establishing a routing session among routing apparatuses builds a virtual network.

In the VPN group information shown in FIG. 6, a vnet tag is described. In the vnet tag, VPN group basic information 541, routing point information 542, and routing session information 543, are preferably described. In the VPN group basic information 541, a relay group ("group") to which a VPN group belongs, identification information ("id") of the VPN group, a last modification time ("lastmod"), and a name ("name") of the VPN group, are described. In the routing point information 542, identification information of routing apparatuses that perform routing at a time of performing communication among VPN groups is described. In an example shown in FIG. 6, the client terminal 11, the client terminal 21, and the relay server 3 are described as the routing apparatuses. In the routing session information 543, the routing apparatuses connected to one another in the VPN group are described. In the routing session information 543, the routing apparatuses are defined such that they are classified into the side ("sp (start point)") that takes initiative to perform a communication control and the side ("ep (end point)") that receives the communication control during a routing session establishment process of starting a VPN in the VPN group. In the following description, the routing apparatus in the side that takes initiative to perform the communication control of establishing the routing session may be sometimes referred to as "start point", and the routing apparatus in the side that receives such a communication control may be sometimes referred to as "end point".

The VPN group information, as well as the relay server information and the relay group information, is shared among the relay servers 1, 2, and 3 that define the VPN group. In a case where a certain relay server performs a process of changing the VPN group information, it is transmitted to the other relay servers making the VPN group, and the VPN group information is updated. In this manner, the VPN group information is dynamically shared. A process of making the VPN group will be described later.

The address filter information storage unit 55 is arranged to store address filter information indicating a routing object device that the routing apparatus is able to designate as a forwarding destination to which a packet should be forwarded at a time when the VPN is started and the routing apparatus performs routing.

In FIG. 7, (a) shows an outline of the address filter information. As shown in (a) of FIG. 7, the client terminal 11 is able to transmit the a packet to the communication apparatus 12. The client terminal 21 is able to transmit a packet to the file server 22, the file server 23, and the communication apparatus 24. The relay server 3 is able to transmit a packet to all of the apparatuses connected to the LAN 30.

Figure 12:
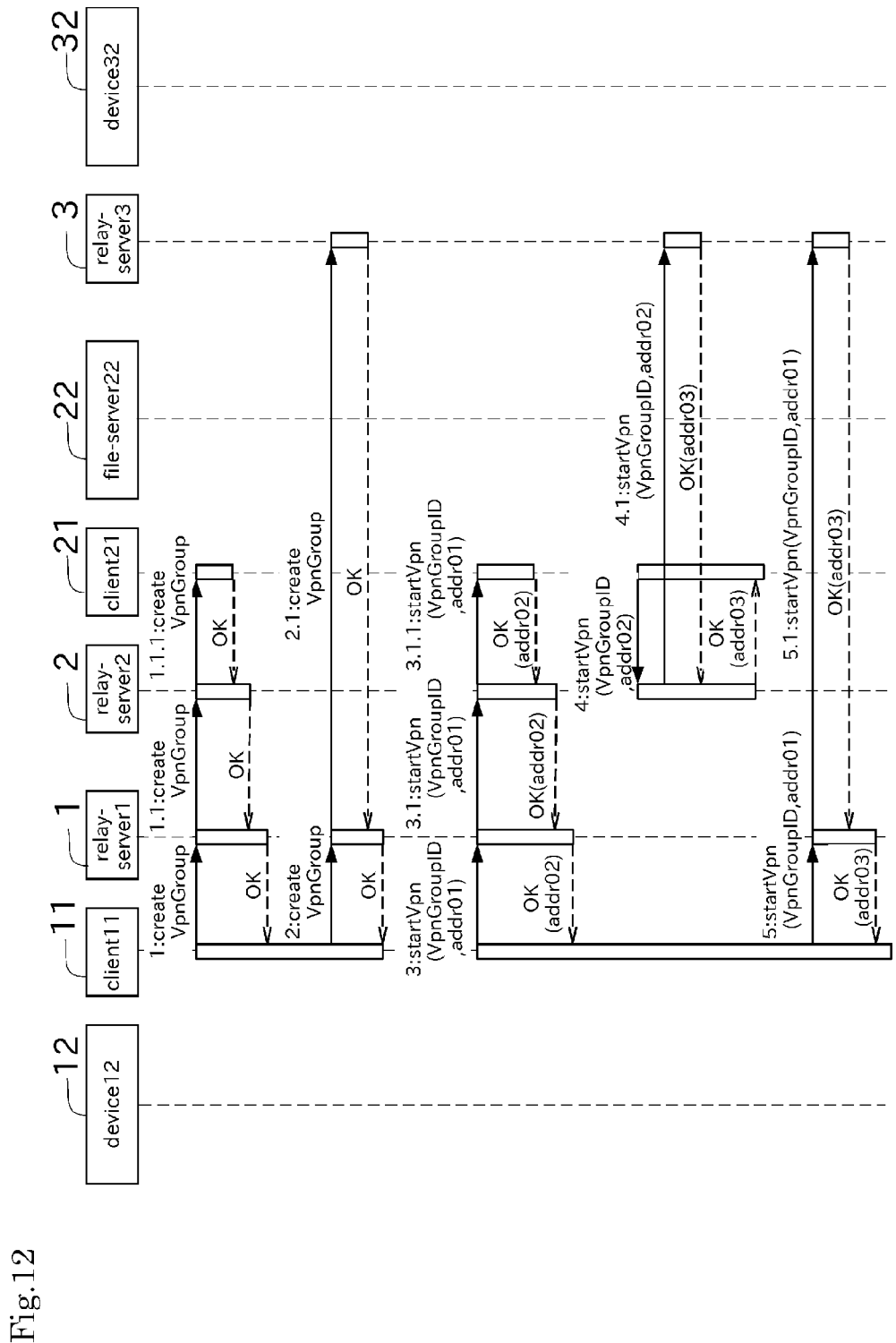
FIG. 12 is a sequence diagram showing a communication process of making the VPN group and a communication process of updating address filter information according to a preferred embodiment of the present invention.

As shown in (b) of FIG. 7, the address filter information storage unit 55 is arranged to store identification information of a routing apparatus in association with an IP address and a name of a routing object device that can be designated by the routing apparatus. Any name, such as a name that is easily recognizable by a user, can preferably be set as the name of the routing object device. For example, the name can be set in consideration of a type of the apparatus (a processor, a communication apparatus, a file server, and the like) and a place where the LAN is arranged. The relay server serving as each routing point is configured to display this address filter information on an external display device or the like. The address filter information is exchanged between the routing apparatuses at a time of starting the VPN, as shown in FIG. 12 which will be described later.

The relay servers 1, 2, 3, and 4 are preferably configured as described above. The client terminals 11, 21, 31, and 41 preferably include storage units 50 and control units 60 including the same or substantially the same configurations as those of the relay servers 1, 2, 3, and 4, though a detailed description of the configurations of the client terminals 11, 21, 31, and 41 is omitted.

Next, a description will be given to a process of building the VPN group and performing routing of a packet in the built VPN group in accordance with a preferred embodiment of the present invention.

Figure 8:
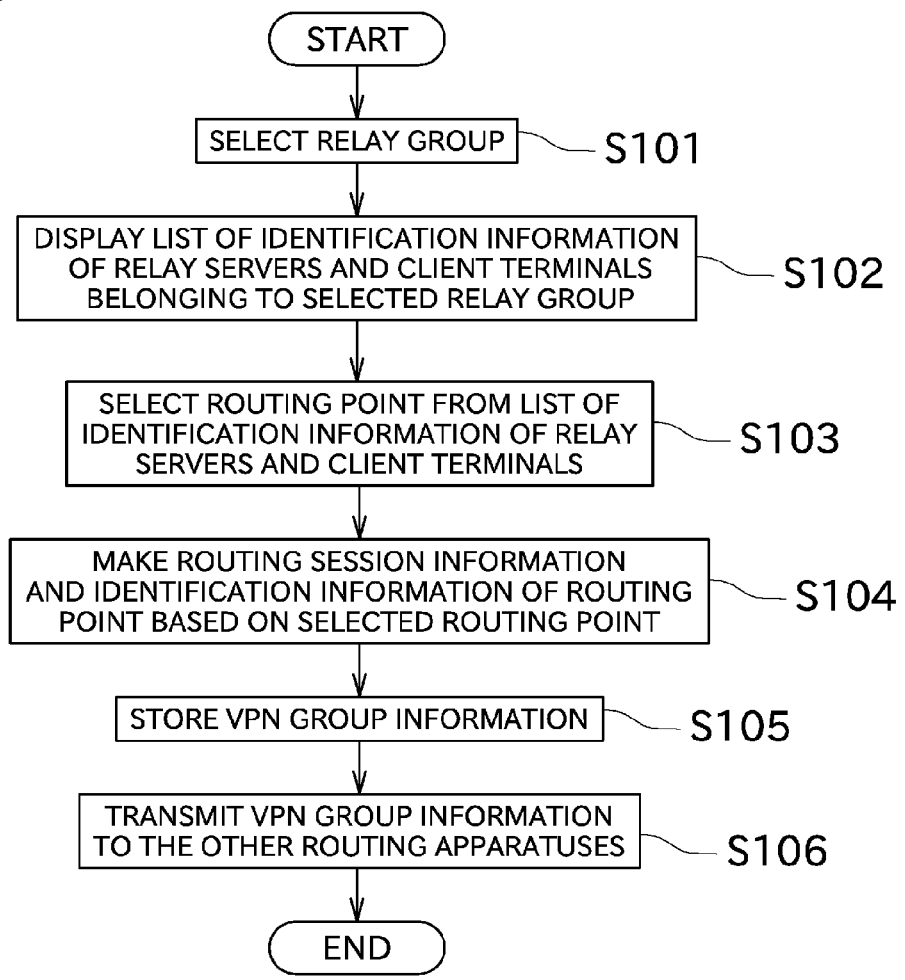
FIG. 8 is a flowchart showing a process of making a VPN group according to a preferred embodiment of the present invention.

Firstly, a flow of building the VPN group will be described with reference to FIGS. 8 and 12. FIG. 8 is a flowchart showing a process of making the VPN group. FIG. 12 is a sequence diagram showing a communication process of making the VPN group and a communication process of updating the address filter information.

A user using the relay communication system 100 operates the client terminals 11, 21, 31, and the like, and thus displays a VPN group setting screen. Here, a case will be described where setting is performed using the client terminal 11. In the setting screen displayed on the client terminal 11, a plurality of relay groups to which this client terminal 11 belongs are displayed. The user selects, from the plurality of relay groups, a relay group in which he/she desires to build a VPN group (S101).

After a relay group is selected, a list of identification information of relay servers and client terminals that belong to the selected relay group and are able to function as routing points, is displayed in a screen of the client terminal 11 (S102). Then, the user selects the identification information of the relay server and the client terminal that are to function as the routing points in the VPN group to be built (S103). In the case described herein, it is assumed that the identification information of the client terminal 11, the client terminal 21, and the relay server 3 is selected by the user.

Then, the routing session information is made based on the selected routing points (S104). The identification information of the routing points is also made based on the identification information of the selected relay server and the like (S104). Identification information of the VPN group, and the like, are added to these information thus made, and thus the VPN group information shown in FIG. 6 is made. The VPN group information storage unit 54 stores this VPN group information (S105).

Then, the client terminal 11 transmits the VPN group information thus made to the other routing apparatuses (the client terminal 21 and the relay server 3) (S106), and thus gives a notification that the VPN group is formed. Here, as shown in FIG. 12, transmission of the VPN group information to the client terminal 21 is performed via the relay server 1 and the relay server 2 (Sequence Number 1: createVpnGroup). Transmission of the VPN group information to the relay server 3 is performed via the relay server 1 (Sequence Number 2: createVpnGroup).

As a result, the process of building the VPN group is completed. Here, in this preferred embodiment, communication between apparatuses is sometimes performed via the relay servers 1, 2, 3, and 4, as illustrated above. However, in the following description, a specific description of a communication process performed via the relay servers 1, 2, 3, and 4 is omitted, and such a process may be expressed as, for example, "the client terminal 11 transmits a packet to the client terminal 21".

Figure 9:
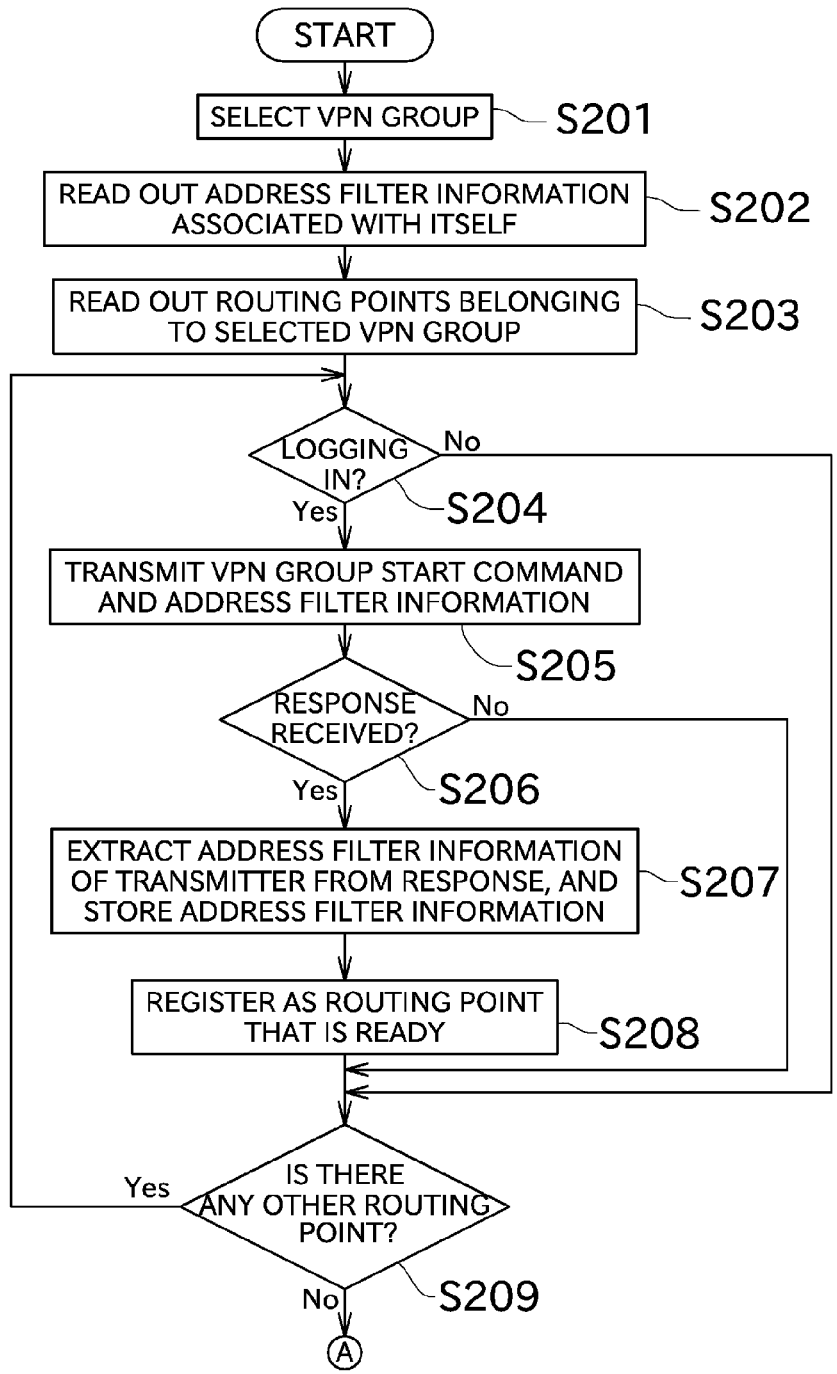
FIG. 9 is a flowchart showing a VPN start process according to a preferred embodiment of the present invention.
Figure 10:
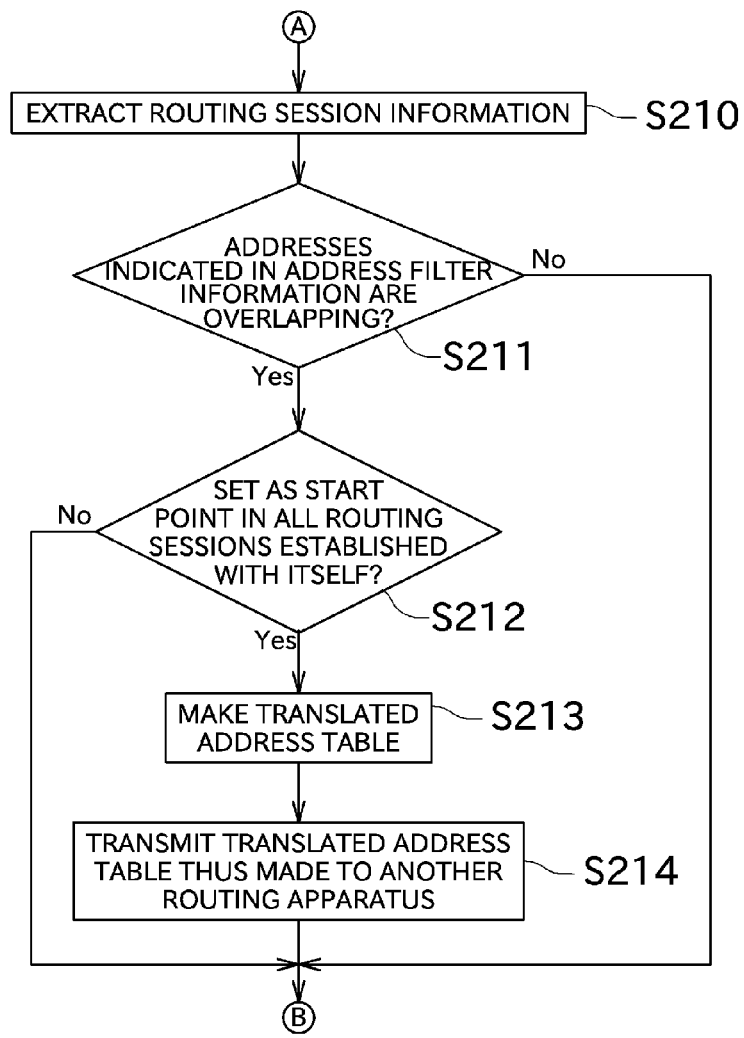
FIG. 10 is a flowchart showing the VPN start process according to a preferred embodiment of the present invention.
Figure 11:
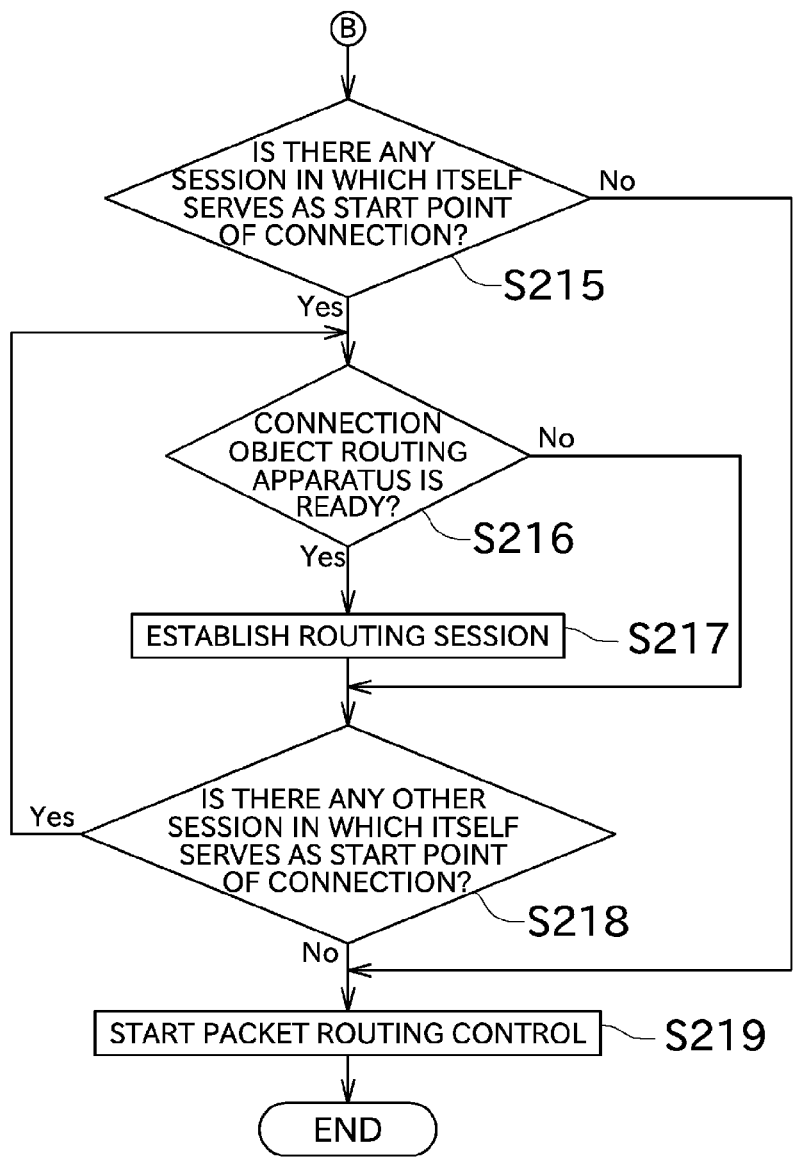
FIG. 11 is a flowchart showing the VPN start process according to a preferred embodiment of the present invention.
Figure 13:
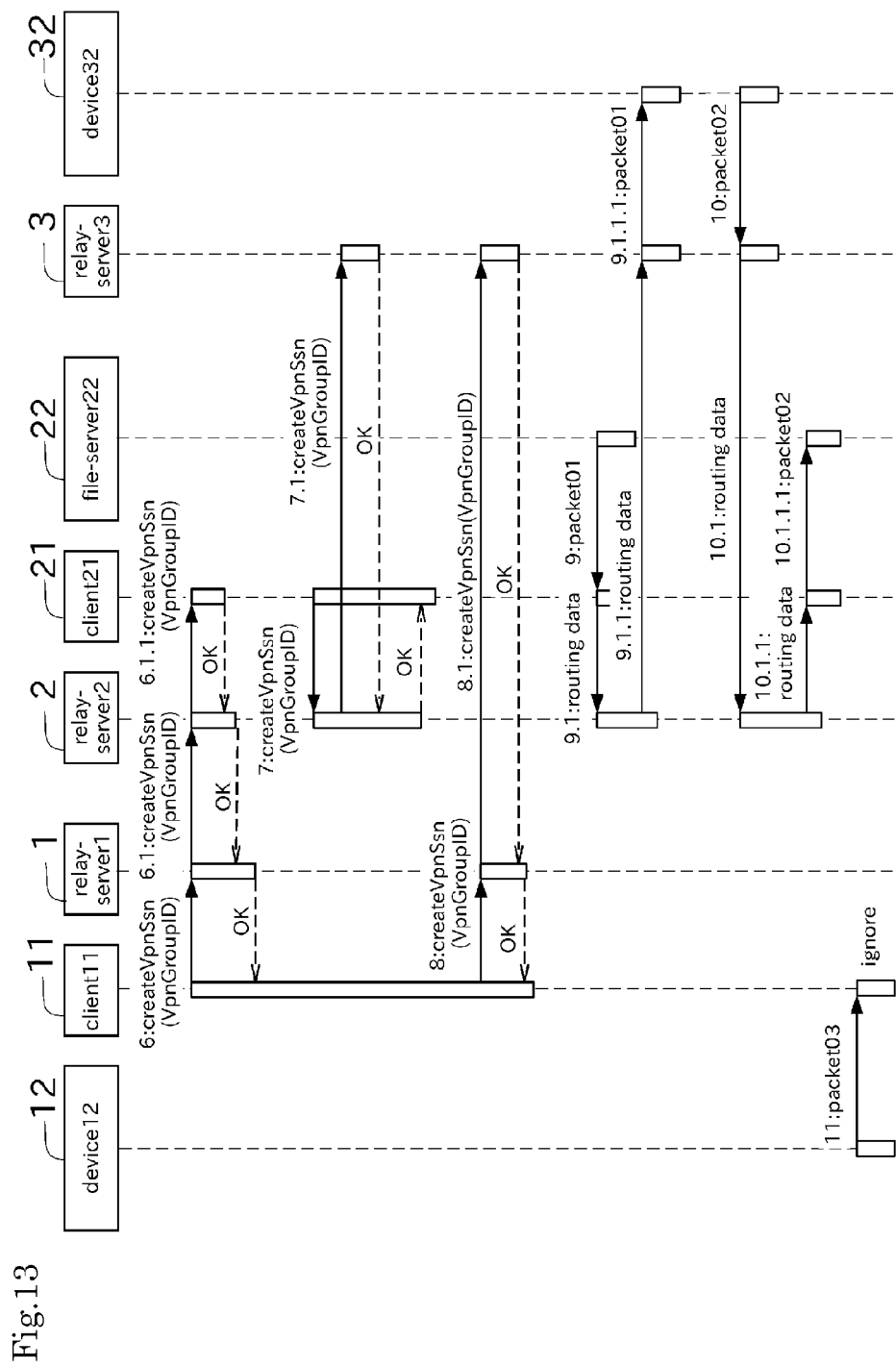
FIG. 13 is a sequence diagram showing a communication process of establishing a routing session and a communication process of transmitting a packet according to a preferred embodiment of the present invention.

Next, a flow of starting a VPN in the built VPN group will be described with reference to FIGS. 9 to 13. FIGS. 9 to 11 are flowcharts showing a VPN start process. FIG. 13 is a sequence diagram showing a communication process of establishing a routing session and a communication process of transmitting a packet.

By operating the client terminals 11, 21, or the like, the user is able to display the built VPN groups on the screen. Then, by selecting an appropriate VPN group from the displayed VPN groups (S201), the user is able to cause the VPN start process to be performed. In the description given herein, it is assumed that the user operates the client terminal 11 and selects the VPN group defined in the above-described manner (the VPN group in which the client terminal 11, the client terminal 21, and the relay server 3 are routing apparatuses).

The client terminal 11 firstly reads out the address filter information associated with the client terminal 11 itself (S202). In the address filter information associated with the identification information of the client terminal 11, as shown in FIG. 7, it is described that packet is transmitted to the communication apparatus 12. Then, the client terminal 11 reads out the routing points that belong to the selected VPN group (S203). As a result, based on the content of the VPN group information shown in FIG. 6, the identification information of the client terminal 21 and the relay server 3 is read out.

Based on the relay server information, the client terminal 11 firstly determines whether or not the client terminal 21 is currently logging in (whether the identification information of the relay server is described in "site", or the "site" is blank) (S204). The relay server information shown in FIG. 4 indicates that the client terminal 21 is currently logging in. Therefore, the client terminal 11 transmits a VPN-group start command to the client terminal 21 (S205, Sequence Number 3: startVpn in FIG. 12). At this time, simultaneously, the identification information (VpnGroupID) of the selected VPN group and the address filter information (addr01) associated with the identification information of the client terminal 11 are also transmitted.

This enables the client terminal 21 to identify the VPN group for which a start process should be performed and to obtain the latest address filter information associated with the identification information of the client terminal 11. The client terminal 21 notifies the client terminal 11 that the client terminal 21 has received the signal, and transmits the address filter information (addr02) associated with the client terminal 21 itself to the client terminal 11.

Upon reception of a response from the client terminal 21 (S206), the client terminal 11 stores the received address filter information into the address filter information storage unit 55 (S207). Also, the client terminal 11 registers the client terminal 21 as a routing point that has been ready for starting the VPN (S208).

Then, the client terminal 11 determines whether or not there is any other routing point (S209). At a time point when the VPN start process with respect to the client terminal 21 has been completed, a VPN start process with respect to the relay server 3 is not yet performed. Therefore, the client terminal 11 then performs the processing of S204 to S208 with respect to the relay server 3. More specifically, the client terminal 11 transmits the VPN start command and the address filter information to the relay server 3 (Sequence Number 5: startVpn in FIG. 12). Then, similarly to the case of the client terminal 21, the client terminal 11 receives the address filter information from the relay server 3, and stores it.

These transmission and reception of the VPN-group start command and the address filter information are also performed between the client terminal 21 and the relay server 3 (Sequence Number 4, startVpn). In this manner, the client terminal 11, the client terminal 21, and the relay server 3 obtains the address filter information of the other routing apparatuses.

In this manner, in starting a VPN, each of the routing apparatuses is able to exchange (obtain) the address filter information with the other routing apparatuses, and therefore the VPN is preferably built with use of the latest address filter information. Accordingly, even in a case where the address filter information concerning a portion of the routing apparatuses has been changed before the VPN is started, the VPN is preferably started under a state where such a change is reflected in all the routing apparatuses. This prevents inconsistency in the routing of a packet, and thus improves the reliability.

Then, the client terminal 11 extracts the routing session information from the content stored in the VPN group information storage unit 54 (S210). Then, the client terminal 11 refers to the address filter information stored in S207, to determine whether or not the IP addresses indicated in the address filter information are overlapping (whether or not the IP addresses of the routing object devices shown in (b) of FIG. 7 are overlapping) (S211). In the following, a description will be firstly given to a process that the client terminal 11 performs when the IP addresses indicated in the address filter information are not overlapping, and then a description will be given to a process that the client terminal 11 performs when the IP addresses indicated in the address filter information are overlapping.

As shown in FIG. 7, in the content stored in the address filter information storage unit 55, all the routing object devices have different IP addresses. That is, the IP addresses indicated in the address filter information are not overlapping. Therefore, the client terminal 11 refers to the routing session information extracted in S210, to determine whether or not a routing session in which the client terminal 11 itself serves as a start point is described therein (S215). In the routing session information shown in FIG. 6, it is described that the client terminal 11 serves as a start point in a routing session established with the client terminal 21 and the relay server 3.

Accordingly, the client terminal 11 firstly selects the client terminal 21, and determines whether or not the client terminal 21 is a routing point that has been ready for starting the VPN (S216). Since the client terminal 21 has been ready because of S208 mentioned above, the client terminal 11 performs a communication control on the client terminal 21, to establish a routing session (S217; Sequence Number 6: createVpnSsn).

The client terminal 11 determines whether or not any other routing session in which the client terminal 11 itself serves as a start point of connection is described (S218). At a time point when the routing session establishment process with respect to the client terminal 21 has been completed, the routing session establishment process with respect to the relay server 3 is not yet performed. Therefore, the client terminal 11 performs, on the relay server 3, the same communication control as the communication control performed on the client terminal 21 (Sequence Number 8:

createVpnSsn). As a result, a routing session is established between the client terminal 11 and the relay server 3.

As shown in FIG. 6, in the routing session information, it is described that the client terminal 21 should be a start point of a routing session with the relay server 3. Accordingly, the communication control of establishing the routing session is also performed from the client terminal 21 toward the relay server 3 (Sequence Number 7: createVpnSsn). As a result of the above, routing sessions can be established between the client terminal 11 and the client terminal 21, between the client terminal 11 and the relay server 3, and between the client terminal 21 and the relay server 3. Then, a packet routing control is started (S219). Each of the routing apparatuses does not perform an initial communication control of establishing a routing session unless it is described in the routing session information that itself should be a start point. This prevents collision of the communication control, and establishes a routing session between apparatuses via a simple control.

Next, a process of routing a packet by using the established routing session will be described. In the following, routing for three kinds of packets, namely, a first packet to a third packet, will be described.

Firstly, a description will be given to a case where the client terminal 21 receives, from the file server 22, a first packet in which a destination address is (192.168.33.132) (in which the communication apparatus 32 is designated as the destination) (Sequence Number 9: packet01). A source address of the first packet is (192.168.22.122), which is the IP address of the file server 22. After receiving the first packet, the client terminal 21 compares the IP address of the destination against the address filter information shown in FIG. 7. Then, the client terminal 21 detects a routing point that is able to transmit a packet to the destination described in the first packet.

As shown in FIG. 7, the IP address of the destination of the first packet is included in the address filter information associated with the identification information of the relay server 3. In this case, the client terminal 21 transmits the first packet to the relay server 3 via the routing session established with the relay server 3.

The relay server 3 receives the first packet, and, similarly to client terminal 21, compares the destination address against the address filter information. Consequently, the relay server 3 detects that the relay server 3 itself is described as a routing point that is able to transmit a packet to the destination indicated in the first packet. Then, the relay server 3 transmits the first packet to the communication apparatus 32. Based on the source address of the received first packet, the communication apparatus 32 detects that the source of the first packet is the file server 22.

In the following, a routing apparatus that receives a packet from a routing object device (source) of the LAN to which the routing apparatus itself belongs and transmits the packet to a proper routing session, such as, for example, the client terminal 21 that transmits the first packet, may be referred to as a "routing apparatus functioning as a source-side routing point". On the other hand, a routing apparatus that receives a packet via a routing session and transmits the packet to a routing object device (destination) of the LAN to which the routing apparatus itself belongs, such as the relay server 3 that transmits the first packet, may be referred to as a "routing apparatus functioning as a destination-side routing point".

Next, a description will be given to a case where the relay server 3 receives, from the communication apparatus 32, a second packet in which a destination address is (192.168.22.122) (in which the file server 22 is designated as the destination) (Sequence Number 10: packet02). In the address filter information shown in FIG. 7, the client terminal 21 is designated as a routing point that is able to transmit a packet to the destination indicated in the second packet. Accordingly, the relay server 3 transmits the second packet to the client terminal 21 via the routing session established with the client terminal 21. Then, the client terminal 21 detects that the client terminal 21 itself is described as a routing point that is able to transmit a packet to the destination indicated in the second packet, and transmits the second packet to the file server 22 that is the destination. Based on the source address of the received second packet, the file server 22 detects that the source of the second packet is the communication apparatus 32.

In the transmission of the second packet, the relay server 3 corresponds to the routing apparatus functioning as a source-side routing point, and the client terminal 21 corresponds to the routing apparatus functioning as a destination-side routing point.

Next, a description will be given to a case where the client terminal 11 receives, from the communication apparatus 12, a third packet whose destination has an IP address of (192.168.5.51) (Sequence Number 11: packet03). The client terminal 11 compares the IP address of the destination against the address filter information, and consequently detects that no routing point that is able to transmit a packet to the destination is described. In this case, the client terminal 11 does not transmit the received third packet to anywhere.

Thus, in this preferred embodiment of the present invention, routing object data is fed through a routing session at an application layer. Therefore, the above-described routing is different from an ordinary IP routing.

Routing at the application layer allows LANs in distant places to communicate with each other by using the private IP addresses without regard to a WAN. Moreover, as described above, the routing apparatus is able to display the name of the routing object device that is designatable as the forwarding destination to which a packet should be forwarded. This enables the user to easily recognize an apparatus to which the packet is preferably transmitted by using the VPN.

Next, a description will be given to a process that the routing apparatus performs upon detection of that addresses indicated in the address filter information are overlapping, and a control that is performed when a packet is routed based on the process. Firstly, the process that the routing apparatus performs upon detection of that addresses indicated in the address filter information are overlapping will be described with reference to FIGS. 10, 14, and 15. FIG. 14 is a diagram showing an exemplary content stored in the address filter information storage unit after a translated address table is notified. FIG. 15 is a diagram showing a display content at a time when a communication IP address is displayed on an external display device.

In the following, a description will be given to a case where the content stored in the address filter information is a content shown in (a) of FIG. 14 instead of the content shown in FIG. 7. In this case, the IP addresses indicated in the address filter information are overlapping, in a region enclosed by the alternate long and two short dashes line in (a) of FIG. 14 (more specifically, the address filter information associated with the client terminal 21 conflicts with the address filter information associated with the relay server 3). Therefore, in S211 (FIG. 10) mentioned above, the client terminal 11 determines that the IP addresses indicated in the address filter information are overlapping. Then, based on the routing session information that has been readout in S210, the client terminal 11 determines whether or not the client terminal 11 itself is set as the side (start point) that takes initiative to perform the communication control. This determination is made in all the routing sessions established with the client terminal 11 itself (S212).

In the description herein, as shown in FIG. 6, the client terminal 11 is set as the start point in all the routing sessions (two routing sessions) established with the client terminal 11 itself. Therefore, the client terminal 11 makes a translated address table (S213). The translated address table is a table in which the overlapping IP address is associated with a communication IP address (translated address) that is an IP address not used in the VPN group for which a start-up process is currently executed (more specifically, a table indicated in the middle two columns in (b) of FIG. 14). Using the communication IP address preferably starts the VPN without changing an actual IP address.

The client terminal 11 transmits the translated address table thus made to another routing apparatus (S214). Then, based on the translated address table, the client terminal 11, and another routing apparatuses that has received the translated address table, add the communication IP address to the content stored in their address filter information storage units, as shown in (b) of FIG. 14.

In order to inform the user of the communication IP address thus added, the client terminal 11 (or the relay server 3) is able to display the content shown in FIG. 15 on a display included in the client terminal 11 (or on an external display device). In this display, a hyphen is shown in the section that indicates the actual IP address of the communication apparatus 12. This indicates that the communication IP address and the actual IP address are identical. Needless to say, instead of the hyphen, the IP address may be displayed, or the notification that the communication IP address and the actual IP address are identical may be displayed. In this display screen, a display of "please perform communication using the communication IP address" may be added to the content shown in FIG. 15.

In the determination of S212, any of the routing apparatuses other than the client terminal 11 has one or more routing sessions in which the routing apparatus itself is set as the side (end point) that receives the communication control, as shown in FIG. 6. Therefore, making and transmission of the translated address table are not performed. In this manner, in this preferred embodiment of the present invention, the routing apparatus that, for example, makes the translated address table is uniquely set. This prevents occurrence of a situation where the processing of S212 and S213 is performed a plurality of times.

Figure 16:
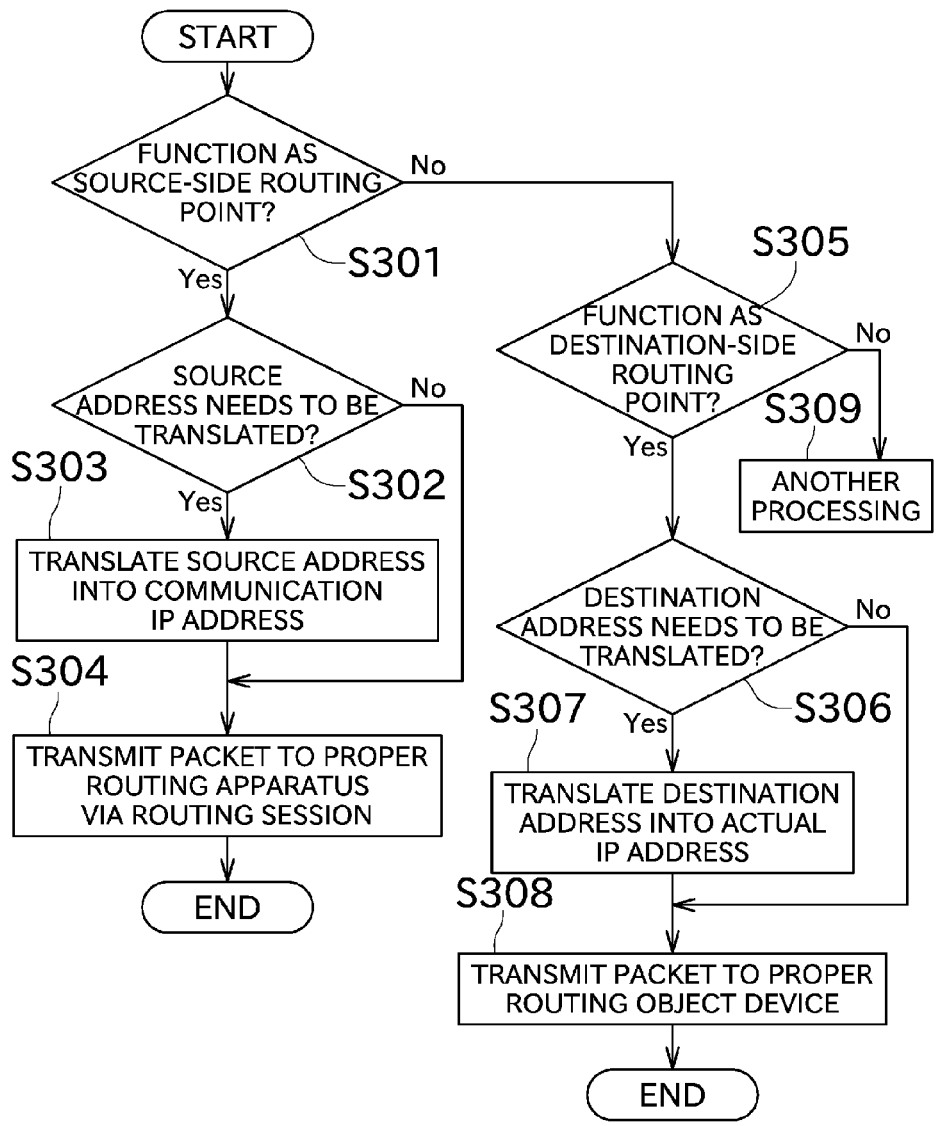
FIG. 16 is a flowchart showing a process that is performed by a routing apparatus upon reception of a routing packet according to a preferred embodiment of the present invention.
Figure 17:
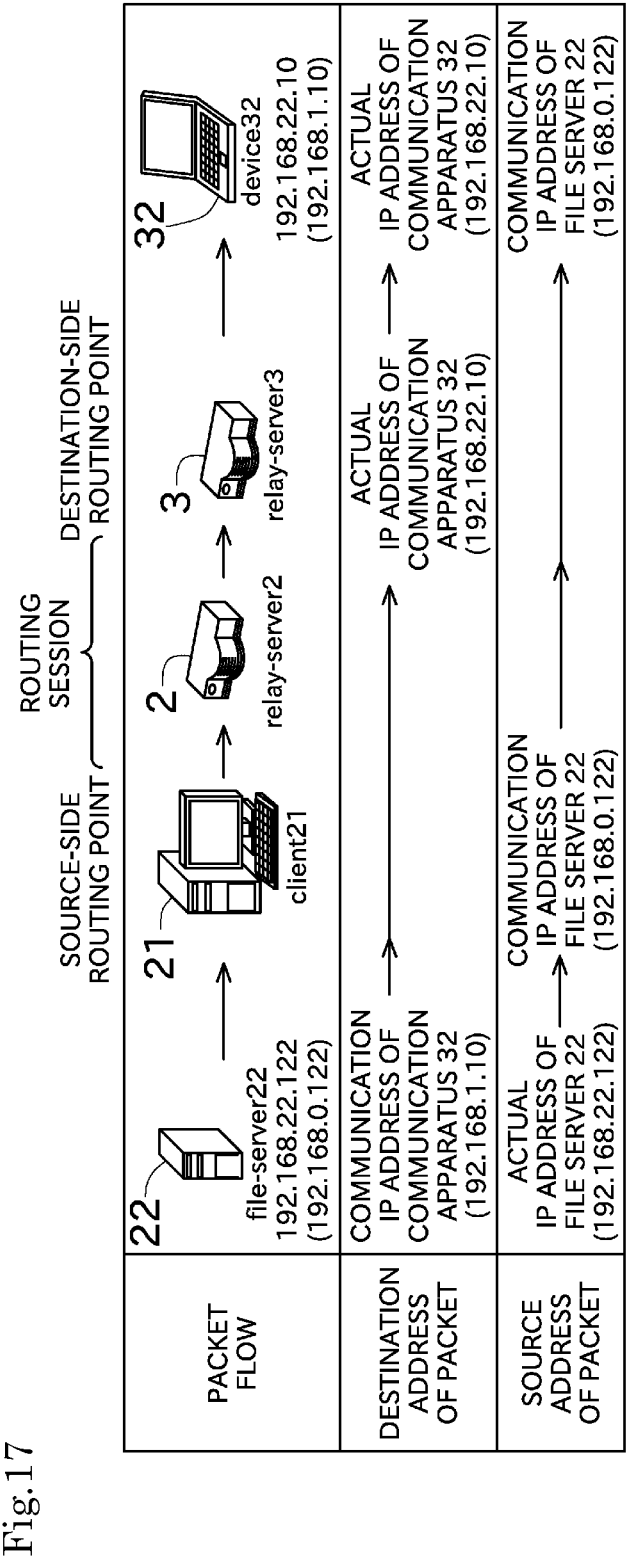
FIG. 17 is a diagram showing a flow of a communication process that is performed with use of actual IP addresses and communication IP addresses according to a preferred embodiment of the present invention.
Figure 18:
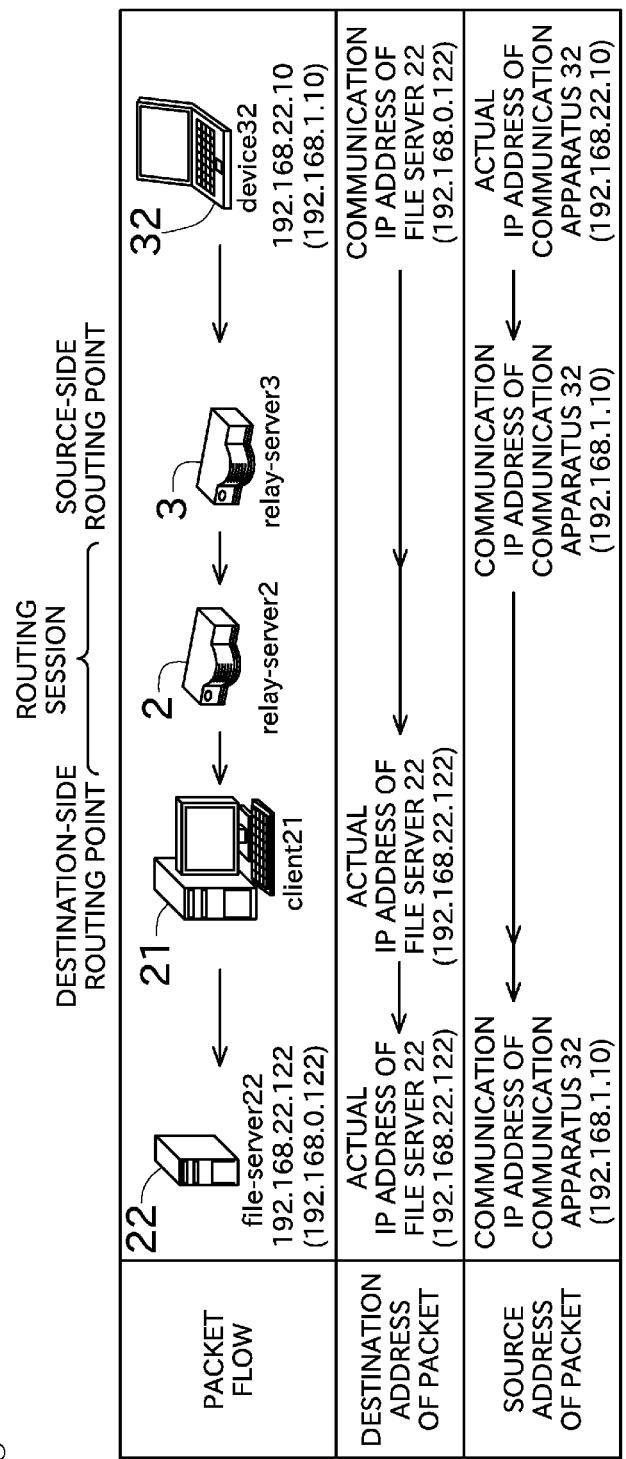
FIG. 18 is a diagram showing a flow of a communication process that is performed with use of actual IP addresses and communication IP addresses according to a preferred embodiment of the present invention.

Next, a control at a time of routing a packet with use of the communication IP address will be described with reference to FIGS. 16 to 18. FIG. 16 is a flowchart showing a process that the routing apparatus performs when receiving a routing packet. FIGS. 17 and 18 are diagrams showing a flow of a communication process that is performed with use of the actual IP address and the communication IP address.

On, for example, the display included in the client terminal 11, the user sees a display informing that the communication IP address has been made, and then the user makes setting such that the communication IP address is used as the destination address when a packet is transmitted by using the communication apparatus or the like. On the other hand, as for the source address used when a packet is transmitted by using the communication apparatus or the like, no particular change has to be made, and the actual IP address of the communication apparatus or the like is used.

In a case of functioning as the source-side routing point (S301), the routing apparatus determines whether or not it is necessary to translate the source address with respect to the received packet (in detail, the routing packet) (S302). The routing apparatus makes the determination of S302 based on the translated address table corresponding to this routing apparatus. More specifically, when the source address (actual IP address) of the received packet is associated with the communication IP address, the routing apparatus translates the source address from the actual IP address into the communication IP address based on the translated address table (S303). In the following, such a process of translating the source address of a packet when a packet whose source address needs translation is received will be referred to as a source address translation process.

Then, the routing apparatus selects a routing apparatus that is able to transmit a packet to the destination indicated in the destination address (communication IP address) of the received packet, and transmits the packet to this routing apparatus via the routing session (S304). In a case where it is determined in S302 that the source address is not associated with the communication IP address, the source address is not translated, and the packet is transmitted to a proper routing apparatus (S304).

In this manner, the translation of the source address is performed by the routing apparatus functioning as the source-side routing point.

On the other hand, in a case of functioning as the destination-side routing point (S305), the routing apparatus determines that whether or not it is necessary to translate the destination address with respect to the received packet (S306). The routing apparatus makes such a determination based on the translated address table corresponding to this routing apparatus. More specifically, when the destination address of the received packet is the communication IP address, the routing apparatus translates the destination address from the communication IP address into the actual IP address based on the translated address table (S307). In the following, such a process of translating the destination address of a packet when a packet whose destination address needs translation is received will be referred to as a destination address translation process. Then, the packet is transmitted to the routing object device that is the destination (S308). In a case where the destination address of the received packet is the actual IP address, translation is not necessary, and therefore the packet is transmitted to the routing object device that is the destination without performing the translation process (S308). In a case where the routing apparatus does not function as the source-side routing point and the destination-side routing point, another processing (for example, discarding of the packet) is performed (S309).

As thus far described, the translation of the destination address is performed by the routing apparatus functioning as the destination-side routing point.

Using the communication IP address as described above preferably starts a VPN and transmit and receive a packet without changing the actual IP address. The determination of whether or not the IP addresses indicated in the address filter information are overlapping (S211) may preferably be performed not only at a time of starting the VPN but also during running of the VPN. Also in a case where any overlap is detected during running of the VPN, the same control as described above is preferably performed, so that the transmission and reception of the packet in the VPN is preferably continued without stopping the VPN.

In the following, a specific description will be given to a process that the routing apparatus performs when a packet (in detail, a routing packet) is transmitted from the file server 22 to the communication apparatus 32 and a process that the routing apparatus performs when a packet is transmitted from the communication apparatus 32 back to the file server 22, as indicated by the Sequence Numbers 9 and 10 in FIG. 13.

Firstly, a case of transmitting a packet from the file server 22 to the communication apparatus 32 will be described with reference to FIG. 17. In the upper section of FIG. 17, the packet is sequentially fed from left to right. A change of the destination address of the packet in the course of this feeding is shown in the middle section. A change of the source address of the packet in the course of this feeding is shown in the lower section. As described above, the destination address of the packet at a time when the file server 22 transmits the packet is the communication IP address of the communication apparatus 32. The source address of this packet is the actual IP address of the file server 22. Since the client terminal 21 functions as the source-side routing point, the client terminal 21 determines whether or not it is necessary to translate the source address with respect to the received packet (S302). Here, as shown in (b) of FIG. 14, the actual IP address of the file server 22 is associated with the communication IP address, the client terminal 21 translates the source address of the packet from the actual IP address into the communication IP address based on the translated address table (S303; source address translation process).

In the address filter information shown in (b) of FIG. 14, the relay server 3 is designated as a routing point that is able to transmit a packet to the communication IP address of the communication apparatus 32. Accordingly, the client terminal 21 transmits the packet to the relay server 3 via the routing session established with the relay server 3 (S304).

The relay server 3, which receives this packet, functions as the destination-side routing point. Therefore, the relay server determines whether or not it is necessary to translate the destination address with respect to the received packet (S306). As a result, based on the translated address table shown in (b) of FIG. 14, the relay server 3 finds that the destination address is the communication IP address of the communication apparatus 32. Accordingly, the relay server 3 translates the destination address from the communication IP address into the actual IP address (S307; destination address translation process). Then, the relay server 3 transmits the packet to the communication apparatus 32 that is the destination (S308). Based on the source address of the received packet, the communication apparatus 32 detects that the source of the packet is the file server 22.

Next, a case of transmitting a packet (in detail, a routing packet) from the communication apparatus 32 back to the file server 22 will be described with reference to FIG. 18. In the upper section of FIG. 18, the packet is sequentially fed from right to left. A change of the destination address of the packet in the course of this feeding is shown in the middle section. A change of the source address of the packet in the course of this feeding is shown in the lower section. In this case, the relay server 3 functions as the source-side routing point, and the client terminal 21 functions as the destination-side routing point. Therefore, the relay server 3, which has received the reply packet from the communication apparatus 32, determines whether or not it is necessary to translate the source address (S302), and translates the source address from the actual IP address into the communication IP address (S303; source address translation process). Then, the relay server 3 transmits the packet to the client terminal 21 via the routing session (S304).

On the other hand, the client terminal 21, which has received the reply packet via the routing session, determines whether or not it is necessary to translate the destination address (S306), and translates the destination address from the communication IP address into the actual IP address (S307; destination address translation process). Then, the client terminal 21 transmits the packet to the file server 22 via the routing session (S308).

Figure 19:
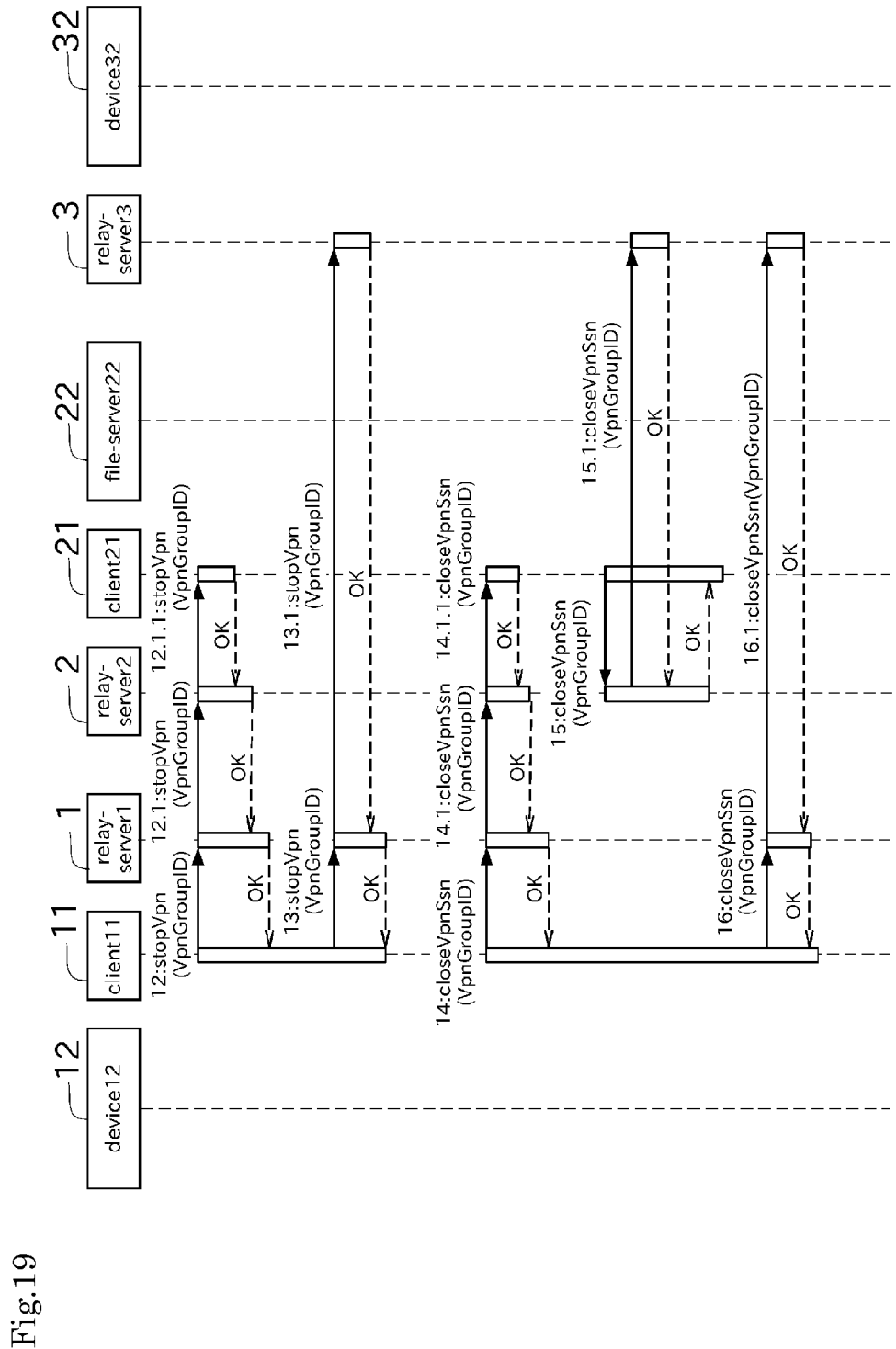
FIG. 19 is a sequence diagram showing a communication process of terminating the VPN group according to a preferred embodiment of the present invention.

Next, a process of terminating the VPN will be described with reference to FIG. 19. FIG. 19 is a sequence diagram showing a communication process of terminating the VPN group. By operating the client terminals 11, 21, or the like, the user is able to start a process of terminating the VPN. A description herein will be based on the assumption that the user operates the client terminal 11 to start the process of terminating the VPN.

Upon reception of an instruction to terminate the VPN, the client terminal 11 transmits such a notification as well as the identification information of the VPN group to the client terminal 21 and the relay server 3 (Sequence Numbers 12, 13: stopVpn). The identification information of the VPN group received from the client terminal 11 enables the client terminal 21 and the relay server 3 to recognize the VPN group for which the VPN should be terminated.

The client terminal 11 receives a signal indicating an acknowledgement of the termination of the VPN from the client terminal 21 and the relay server 3, and then transmits a routing-session termination command to the client terminal 21 (Sequence Number 14: closeVpnSsn). The client terminal 11 transmits the routing-session termination command to the relay server 3, too (Sequence Number 16: closeVpnSsn).

The transmission of the routing-session termination command is also made from the client terminal 21 to the relay server 3 (Sequence Number 15; closeVpnSsn). In the above-described manner, the routing sessions established between the client terminal 11 and the client terminal 21, between the client terminal 11 and the relay server 3, and between the client terminal 21 and the relay server 3, can be terminated. Thus, the VPN in the VPN group is terminated.

As illustrated above, the relay server 3 includes the relay group information storage unit 51, the relay server information storage unit 52, the VPN group information storage unit 54, the address filter information storage unit 55, and the communication control unit 63. The relay group information storage unit 51 is arranged to store the relay group information (the group information 511 and the group configuration information 512) concerning the relay group including the other relay servers 1, 2, and 4 that are mutually connectable with itself (relay server 3). The relay server information storage unit 52 is arranged to store the relay server information defined by the server information 521 and the belonging information 522. The server information 521 preferably includes the start-up information concerning the relay servers 1, 2, 3, and 4 that belong to the relay group. The belonging information 522 includes the start-up information and the registration information concerning the client terminals 11, 21, 31, and 41 connected to the relay servers 1, 2, 3, and 4 that belong to the relay group. The VPN group information storage unit 54 relates to a VPN group defined by routing apparatuses (the client terminal 11, the client terminal 21, and the relay server 3) that are set as routing points among the communication apparatuses included in the relay communication system based on the relay group information and the relay server information. The VPN group is configured to perform communication in a virtual private network via a routing session established among the routing apparatuses. The VPN group information storage unit 54 is arranged to store identification information (routing point information 542) of the routing apparatuses that define the VPN group and the routing session information 543 indicating the routing apparatuses that are connected to one another. The address filter information storage unit 55 is arranged to store the address filter information indicating an address of a routing object device that the routing apparatus is able to designate as a forwarding destination to which a packet should be forwarded, in association with identification information of the routing apparatus. The communication control unit 63 is arranged and programmed to perform controls of: upon detection of that the address included in the address filter information overlaps in a single VPN group, causing a communication IP address (translated address) that is an address not used in this VPN group to be associated with the overlapping address, storing the communication IP address into the address filter information, and transmitting the address filter information to another routing apparatus; and performing routing based on the address filter information and the translated address.

This enables the relay server 3 to build a VPN with the routing apparatuses selected from the other communication apparatuses (other relay servers and the client terminals) included in the relay communication system. Therefore, for example, a file is preferably only with a necessary apparatus. Even in a case where a VPN is built between networks to which identical addresses are assigned, routing of a packet is preferably performed without changing an actual address.

In the relay server 3 of this preferred embodiment, the communication control unit 63 is arranged and programmed to perform the source address translation process and the destination address translation process. Particularly, in this preferred embodiment of the present invention, the source address translation process is preferably performed in a case where the relay server 3 functions as the source-side routing point, and the destination address translation process is preferably performed in a case where the relay server 3 functions as the destination-side routing point.

Accordingly, performing the source address translation process enables the destination of the packet to be informed of the source of the packet, and performing the destination address translation process enables the packet to be transmitted to a proper destination.

In the relay server 3 of this preferred embodiment, the actual IP address and the communication IP address are displayable on an external display device, in association with the routing object device for which the addresses are set.

This informs the user of which routing object device is associated with the communication IP address. Accordingly, for example, setting for designating the communication IP address as the destination address is simplified.

In the relay server 3 of this preferred embodiment, the VPN group information storage unit 54 is arranged to store, as the routing session information 543, identification information of a routing apparatus (start point) that takes initiative to perform a communication control of establishing a routing session and identification information of a routing apparatus (end point) that receives the communication control. In a case where the relay server 3 itself is set as the side that takes initiative to perform the communication control in all the routing sessions established with the relay server 3 itself, the communication control unit 63 is arranged and programmed to perform a control to cause the communication IP address to be associated with the overlapping address and transmitting the communication IP address to another routing apparatus.

Accordingly, in the VPN group, normally, one routing apparatus performs the control to make the communication IP address. This prevents the process of associating the communication IP address, and the like, from being performed a plurality of times.

Figure 20:
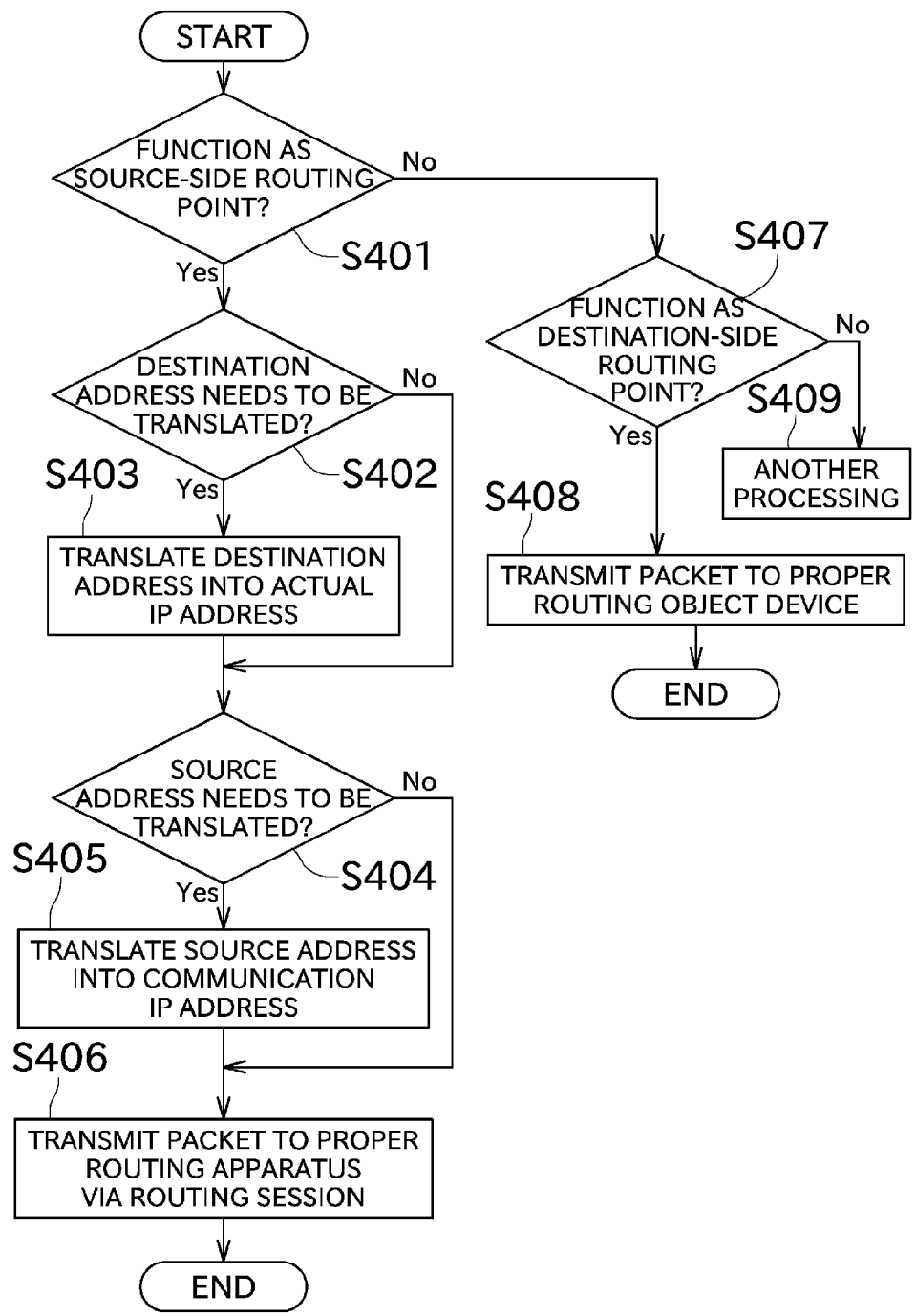
FIG. 20 is a flowchart showing a process that is performed by a routing apparatus upon reception of a routing packet in a second preferred embodiment of the present invention.

Next, a second preferred embodiment will be described with reference to FIG. 20. FIG. 20 is a flowchart showing a process that the routing apparatus performs when a routing packet is received in the second preferred embodiment. Since the process shown in FIG. 20 includes the same processing as the processing shown in FIG. 16, a description thereof will be partially omitted or simplified.

In the first preferred embodiment of the present invention described above, the source address translation process is preferably performed in the source-side routing point, and the destination address translation process is preferably performed in the destination-side routing point. However, timings of performing the source address translation process and the destination address translation process are not limited to the ones described in the first preferred embodiment above. The source address translation process and the destination address translation may be performed in either of the source-side and destination-side routing points, with any combination. In the second preferred embodiment of the present invention described below, not only the source address translation process but also the destination address translation process is performed in the source-side routing point.

In a case of functioning as the source-side routing point (S401), the routing apparatus determines whether or not it is necessary to translate the destination address (S402). This determination is made in the same manner as in S306 of the first preferred embodiment. Then, upon a determination that it is necessary to translate the destination address, the routing apparatus translates the destination address into the actual IP address (S403; destination address translation process). Then, in the same manner as in the first preferred embodiment, upon a determination that it is necessary to translate the destination address (S404), the routing apparatus performs the source address translation process (S405). Then, in the same manner as in the first preferred embodiment, the routing apparatus selects a routing session based on the address filter information, and transmits a packet to a proper routing apparatus via the routing session (S406).

In a case where the destination address is translated into the actual IP address in the source-side routing point, it seems that the packet cannot be transmitted to a proper routing apparatus because this actual IP address overlaps with the IP address of another apparatus. However, the source-side routing apparatus selects a routing session based on the address filter information, and thus transmits a packet to a proper routing apparatus. Accordingly, a preferred embodiment of the present invention transmits a packet to a proper destination even though the destination address is translated in the source-side routing apparatus.

In a case of functioning as the destination-side routing point (S407), the routing apparatus does not perform the process of translating the destination address, because the destination address of the received packet has been already translated as needed.

As described above, the relay server (in detail, the communication control unit 63) of the second preferred embodiment performs both the source address translation process and the destination address translation process. The communication control unit 63 is arranged and programmed to transmit a packet to another routing apparatus via a routing session.

Accordingly, the source-side routing point is able to translate not only the source address but also the destination address. Thus, the address translation process in the destination-side routing point can be omitted.

While some preferred embodiments of the present invention have been described above, the above-described configurations can be changed, for example, as follows. Such changes do not depart from the scope of the present invention.

The communication IP address (translated address) assigned to the routing apparatus may be any IP address as long as the IP address is not used in the VPN group.

A format in which the above-described relay group information, relay server information, client terminal information, VPN group information, address filter information, and the like, are stored is not limited to XML format. These kinds of information can be stored in any appropriate format.

Instead of the configuration of the above-described preferred embodiments, a configuration is also acceptable in which an external server used in communication between relay servers is connected on the Internet and caused to exert a function as an SIP (Session Initiation Protocol) server, thus performing communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server comprising:
   a relay group information memory arranged to store relay group information concerning a relay group including another relay server that is mutually connectable with the relay server;
   a relay server information memory arranged to store relay server information including relay server start-up information, client terminal start-up information, and client terminal registration information, the relay server start-up information including information concerning whether or not the relay server belonging to the relay group is currently logging into a relay communication system, the client terminal start-up information including information concerning whether or not a client terminal is currently logging into the relay communication system, and the client terminal registration information concerning the client terminal;
   a VPN group information memory relating to a VPN group of routing apparatuses that are communication apparatuses being set as routing points among communication apparatuses included in the relay communication system based on the relay group information and the relay server information, the VPN group being configured to perform communication in a virtual private network via a routing session established among the routing apparatuses, the VPN group information memory is arranged to store identification information of the routing apparatuses of the VPN group and routing session information indicating the routing apparatuses that are connected to one another;
   an address filter information memory arranged to store address filter information indicating an address of a routing object device that the routing apparatus is able to designate as a forwarding destination to which a packet is to be forwarded, in association with identification information of the routing apparatus; and
   a communication control processor arranged and programmed to perform controls to: make a plurality of VPN groups and store the plurality of VPN groups in the VPN group information memory; when a VPN group to be started up is selected from the plurality of VPN groups stored in the VPN group information memory and when the relay server is set as a start point, determine whether or not the address included in the address filter information overlaps among the routing apparatuses belonging to the selected VPN group not only at a time of starting up the VPN group but also during running of the VPN group, and upon detection of that the address is overlapping, make a translated address table in which a translated address that is an address not used in the selected VPN group is associated with the overlapping address, and transmit the translated address table to the other routing apparatuses that belong to the selected VPN group; and perform routing based on the translated address; wherein
   the relay server determines whether or not the another relay server or the client terminal is currently logging into the relay communication system, based on the relay server start-up information or the client terminal start-up information; and
   the relay server transmits a VPN- group start command to the another relay server or the client terminal currently logging in.

2. The relay server according to claim 1, wherein the communication control processor is arranged and programmed to perform at least one of:
   a source address translation process to, when receiving a packet in which an actual address is designated as a source address, translate the source address of the packet from the actual address into the translated address; and
   a destination address translation process to, when receiving a packet in which the translated address is designated as a destination address, translate the destination address of the packet from the translated address into an actual address.

3. The relay server according to claim 2, wherein in a case of functioning as a source-side routing point, the communication control processor is arranged and programmed to perform at least one of the source address translation process and the destination address translation process.

4. The relay server according to claim 3, wherein in a case of functioning as a source-side routing point, the communication control processor is arranged and programmed to perform the source address translation process, and transmit a packet to the other routing apparatuses via a routing session.

5. The relay server according to claim 3, wherein in a case of functioning as a source-side routing point, the communication control processor is arranged and programmed to:
   perform both the source address translation process and the destination address translation process; and
   transmit a packet to the other routing apparatuses via a routing session.

6. The relay server according to claim 2, wherein in a case of functioning as a destination-side routing point, the communication control processor is arranged and programmed to perform, among the source address translation process and the destination address translation process, an address translation process that is not performed by a source-side routing point.

7. The relay server according to claim 6, wherein
in a case of functioning as a destination-side routing point, when the communication control processor performs the destination address translation process, the communication control processor is arranged and programmed to forward a packet based on an actual address that is an address obtained after the translation.

8. The relay server according to claim 1, wherein
an actual address and the translated address are displayable on an external display device, in association with a name of the routing object device for which the addresses are set.

9. The relay server according to claim 1, wherein
the VPN group information memory is arranged and programmed to store, as the routing session information, identification information of the routing apparatus in a side that takes initiative to perform a communication control to establish a routing session and identification information of the routing apparatus in a side that receives the communication control;
in a case where the relay server is set as the side that takes initiative to perform the communication control in all routing sessions established with the relay server, the communication control processor is arranged and programmed to perform a control to cause the translated address to be associated with the overlapping address and transmitting the translated address to the other routing apparatuses.

10. A relay communication system comprising:
a plurality of relay servers; and
client terminals that are connectable with each other via the relay servers; wherein
each of the relay servers includes:
    a relay group information memory arranged to store relay group information concerning a relay group including another relay server that is mutually connectable with the relay server;
    a relay server information memory arranged to store relay server information including relay server start-up information, client terminal start-up information, and client terminal registration information, the relay server start-up information including information concerning whether or not the relay server belonging to the relay group is currently logging into the relay communication system, the client terminal start-up information including information concerning whether or not a client terminal is currently logging into the relay communication system, and the client terminal registration information concerning the client terminal;
    a VPN group information memory relating to a VPN group of routing apparatuses that are set as routing points among the relay servers and the client terminals, the VPN group being configured to perform communication in a virtual private network via a routing session established among the routing apparatuses, the VPN group information memory is arranged to store identification information of the routing apparatuses of the VPN group and routing session information indicating the routing apparatuses that are connected to one another;
    an address filter information memory arranged to store address filter information indicating a routing object device that the routing apparatus is able to designate as a forwarding destination to which a packet is to be forwarded, in association with identification information of the routing apparatus; and
    a communication control processor arranged and programmed to perform controls to: make a plurality of VPN groups and store the plurality of VPN groups into the VPN group information memory; when a VPN group to be started up is selected from the plurality of VPN groups stored in the VPN group information memory and when the relay server is set as a start point, determine whether or not the address included in the address filter information overlaps among the routing apparatuses belonging to the selected VPN group not only at a time of starting up of the VPN group but also during running of the VPN group, and upon detection of that the address is overlapping, make a translated address table in which a translated address that is an address not used in the selected VPN group is associated with the overlapping address, and transmit the translated address table to the other routing apparatuses that belong to the selected VPN group; and perform routing based on the translated address table; wherein
    the relay server determines whether or not the another relay server or the client terminal is currently logging into the relay communication system, based on the relay server start-up information or the client terminal start-up information; and
    the relay server transmits a VPN-group start command to the another relay server or the client terminal currently logging in.

11. A routing apparatus comprising:
a relay group information memory arranged to store relay group information concerning a relay group including relay servers that are connectable with each other;
a relay server information memory arranged to store relay server information including relay server start-up information, client terminal start-up information, and client terminal registration information, the relay server start-up information including information concerning whether or not the relay server belonging to the relay group is currently logging into a relay communication system, the client terminal start-up information including information concerning whether or not a client terminal is currently logging into the relay communication system, and the client terminal registration information concerning the client terminal;
a VPN group information memory relating to a VPN group of routing apparatuses that are communication apparatuses being set as routing points among communication apparatuses included in the relay communication system based on the relay group information and the relay server information, the VPN group being configured to perform communication in a virtual private network via a routing session established among the routing apparatuses, the VPN group information memory storing identification information of the routing apparatuses that define the VPN group and routing session information indicating the routing apparatuses that are connected to one another;
an address filter information memory arranged to store address filter information indicating an address of a routing object device that the routing apparatus is able to designate as a forwarding destination to which a packet is to be forwarded, in association with identification information of the routing apparatus; and a communication control processor arranged and programmed to perform controls to: make a plurality of VPN groups and store the plurality of VPN groups into the VPN group information memory; when a VPN group to be started up is selected from the plurality of VPN groups stored in the VPN group information memory and when the routing apparatus is set as a start point, determine whether or not the address included in the address filter information overlaps among the routing apparatuses belonging to the selected VPN group not only at a time of starting up the VPN group but also during running of the VPN group, and upon detection of that the address is overlapping, make a translated address table in which a translated address that is an address not used in the selected VPN group is associated with the overlapping address, and transmit the translated address table to the other routing apparatuses that belong to the selected VPN group; and perform routing based on the translated address table; wherein the routing apparatus determines whether or not another relay server or the client terminal is currently logging into the relay communication system, based on the relay server start-up information or the client terminal start-up information; and the routing apparatus transmits a VPN-group start command to the another relay server or the client terminal currently logging in.

12. A relay communication system comprising:

a plurality of relay servers; and client terminals that are connectable with each other via the relay servers; wherein a routing apparatus that is set as a routing point among the relay servers and the client terminals includes:

a relay group information memory arranged to store relay group information concerning a relay group including the relay servers that are connectable with each other;

a relay server information memory arranged to store relay server information including relay server start-up information, client terminal start-up information, and client terminal registration information, the relay server start-up information including information concerning whether or not the relay server belonging to the relay group is currently logging into the relay communication system, the client terminal start-up information including information concerning whether or not a client terminal is currently logging into the relay communication system; and the client terminal registration information concerning the client terminal;

a VPN group information memory relating to a VPN group defined by the routing apparatuses, the VPN group being configured to perform communication in a virtual private network via a routing session established among the routing apparatuses, the VPN group information memory storing identification information of the routing apparatuses that define the VPN group and routing session information indicating the routing apparatuses that are connected to one another;

an address filter information memory arranged to store address filter information indicating a routing object device that the routing apparatus is able to designate as a forwarding destination to which a packet is to be forwarded, in association with identification information of the routing apparatus; and a communication control processor arranged and programmed to perform controls to: make a plurality of VPN groups and store the plurality of VPN groups into the VPN group information memory; when a VPN group to be started up is selected from the plurality of VPN groups stored in the VPN group information memory and when the routing apparatus is set as a start point, determine whether or not the address included in the address filter information overlaps among the routing apparatuses belonging to the selected VPN group not only at a time of starting up of the VPN group but also during running of the VPN group, and upon detection of that the address is overlapping, make a translated address table in which a translated address that is an address not used in the selected VPN group is associated with the overlapping address, and transmit the translated address table to the other routing apparatuses that belong to the selected VPN group; and perform routing based on the translated address table; wherein the routing apparatus determines whether or not another relay server or the client terminal is currently logging into the relay communication system, based on the relay server start-up information or the client terminal start-up information; and the routing apparatus transmits a VPN-group start command to the another relay server or the client terminal currently logging in.

13. The relay server according to claim 1, wherein:

when a routing apparatus other than the relay server stores routing session information indicating that the routing apparatus other than the relay server is set as an end point, the routing apparatus other than the relay server does not make and transmit a translated address table.

* * * * *